(12) United States Patent
Kubo et al.

(10) Patent No.: US 11,002,640 B2
(45) Date of Patent: May 11, 2021

(54) DEVICE ABNORMALITY DIAGNOSIS METHOD AND DEVICE ABNORMALITY DIAGNOSIS DEVICE

(71) Applicant: Mitsubishi Hitachi Power Systems, Ltd., Yokohama (JP)

(72) Inventors: Hiroyoshi Kubo, Tokyo (JP); Hiromi Aota, Tokyo (JP); Yasunari Shibata, Yokohama (JP); Katsuhiko Yokohama, Tokyo (JP); Yasunori Ishizu, Yokohama (JP); Yoshinori Koyama, Tokyo (JP)

(73) Assignee: MITSUBISHI POWER, LTD., Yokohama (JP)

( * ) Notice: Subject to any disclaimer, the term of this patent is extended or adjusted under 35 U.S.C. 154(b) by 283 days.

(21) Appl. No.: 16/080,811

(22) PCT Filed: Sep. 13, 2016

(86) PCT No.: PCT/JP2016/076906
§ 371 (c)(1),
(2) Date: Aug. 29, 2018

(87) PCT Pub. No.: WO2017/168788
PCT Pub. Date: Oct. 5, 2017

(65) Prior Publication Data
US 2019/0086294 A1  Mar. 21, 2019

(30) Foreign Application Priority Data
Mar. 31, 2016  (JP) .............................. JP2016-072723

(51) Int. Cl.
*G01M 99/00*  (2011.01)
*G05B 23/02*  (2006.01)

(52) U.S. Cl.
CPC ............. *G01M 99/00* (2013.01); *G05B 23/02* (2013.01); *G05B 23/0221* (2013.01); *Y02E 20/16* (2013.01); *Y02E 20/18* (2013.01)

(58) Field of Classification Search
CPC ... G01M 99/00; G05B 23/0221; G05B 23/02; Y02E 20/16; Y02E 20/18
See application file for complete search history.

(56) References Cited

U.S. PATENT DOCUMENTS

2015/0293531 A1\* 10/2015 Mikami ............. G05B 23/0235
702/182

FOREIGN PATENT DOCUMENTS

JP  5260343 B2  8/2013
JP  2013-200245 A  10/2013

OTHER PUBLICATIONS

Lv et al., Multifractal Information Fusion Based Condition Diagnosis for Process Complex Systems, 2012, Proc. IMechE, Part E: Journal of Process Mechanical Engineering 227(3), pp. 178-184 (Year: 2012).\*

(Continued)

*Primary Examiner* — Toan M Le
(74) *Attorney, Agent, or Firm* — Westerman, Hattori, Daniels & Adrian, LLP

(57) ABSTRACT

A device abnormality diagnosis method for a device to be diagnosed constituting a plant includes: obtaining time-series data of a plurality of state amounts of the plant which are correlated to an abnormality of the device to be diagnosed; a step of obtaining abnormality diagnosis data on the plurality of state amounts by performing pre-processing on at least one state amount of the plurality of state amounts to exclude, from the time-series data on the state amounts, data of the at least one state amount obtained in an exclusion period which is at least a part of a transient state period during which the device to be diagnosed is affected by a state (Continued)

change of another constituent device of the plant; and a step of performing abnormality diagnosis on the device to be diagnosed on the basis of the abnormality diagnosis data of the plurality of state amounts.

8 Claims, 11 Drawing Sheets

(56) References Cited

OTHER PUBLICATIONS

International Search Report dated Dec. 6, 2016, issued in counterpart application No. PCT/JP2016/076906. (1 page).

* cited by examiner

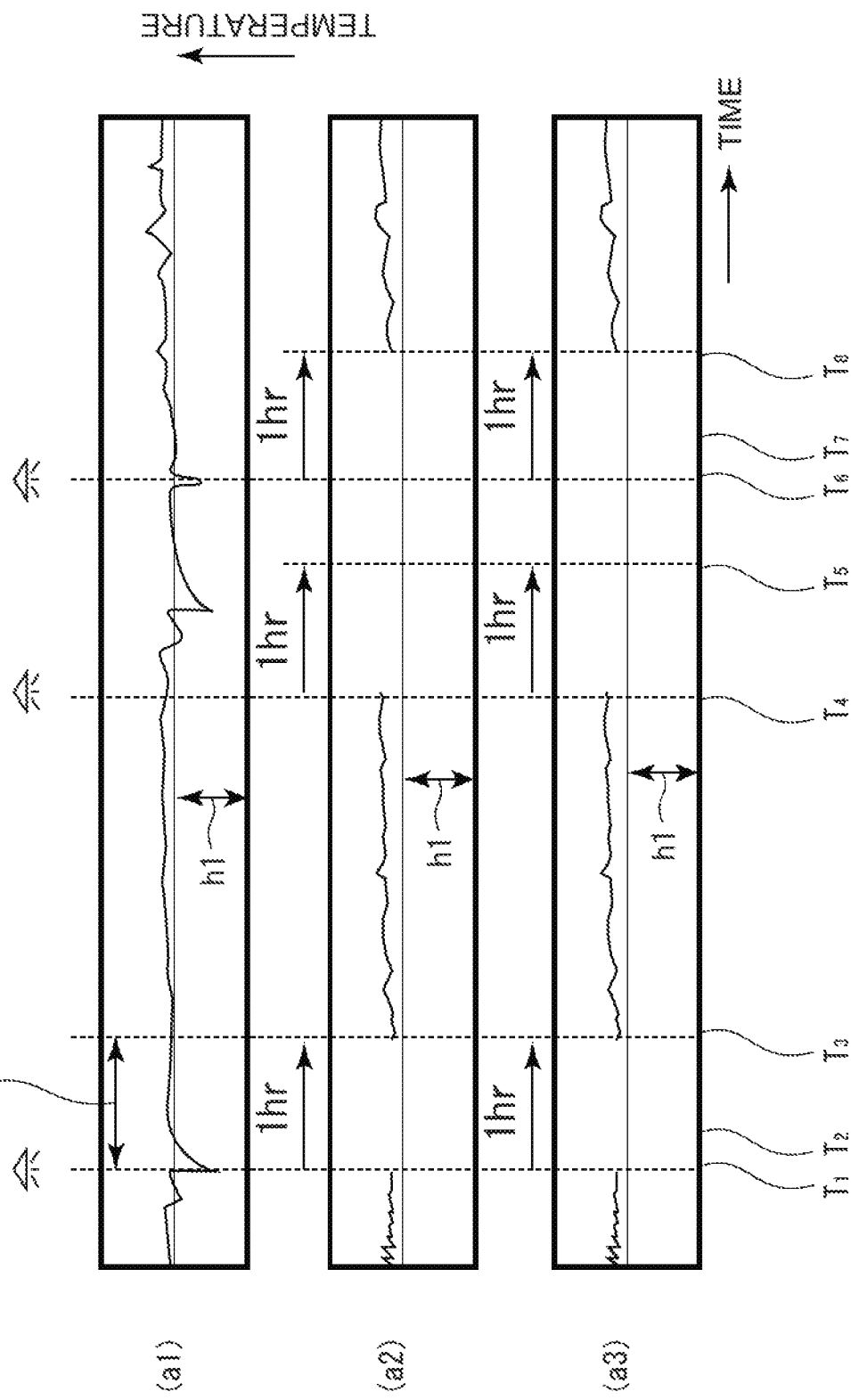

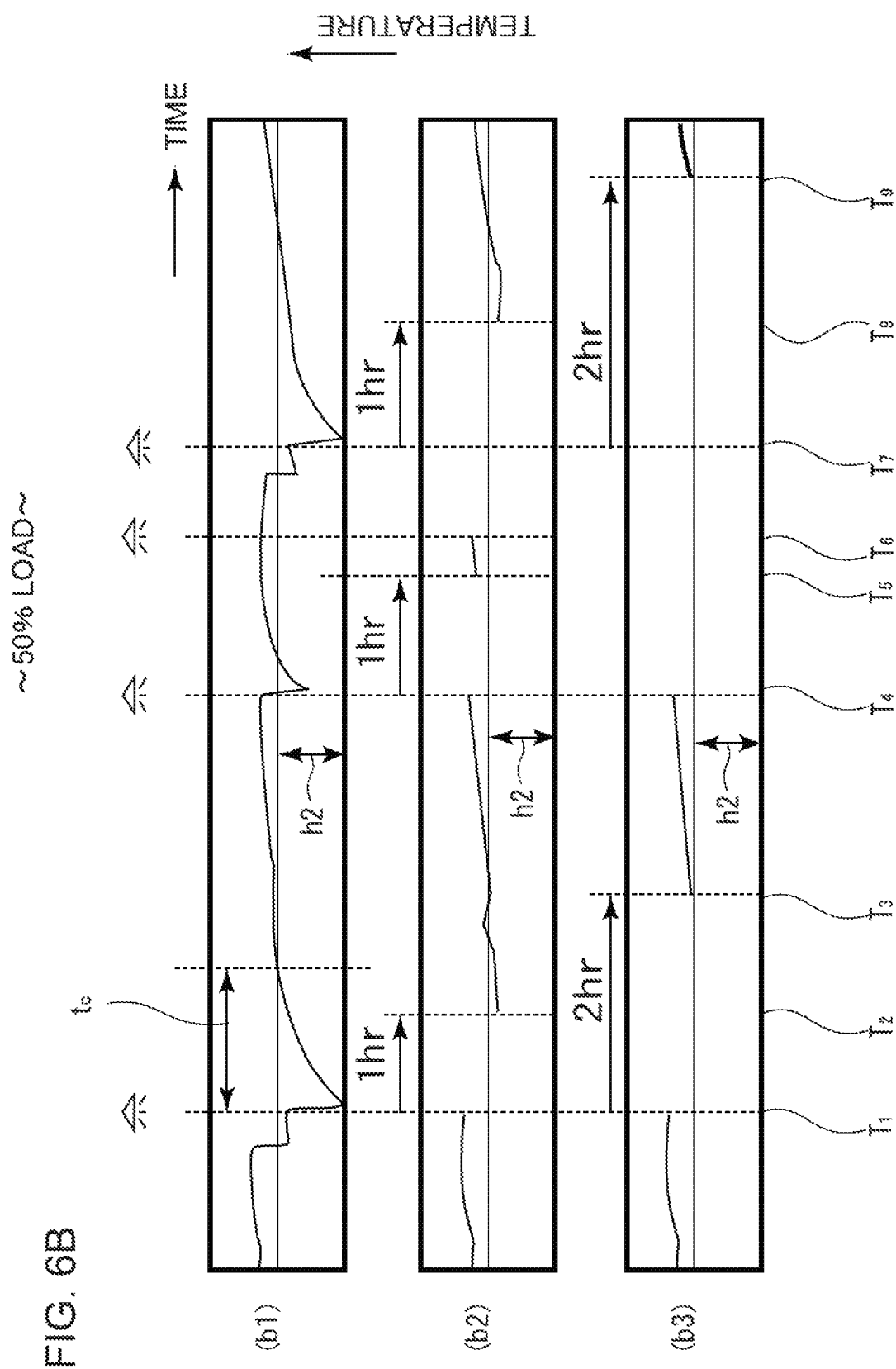

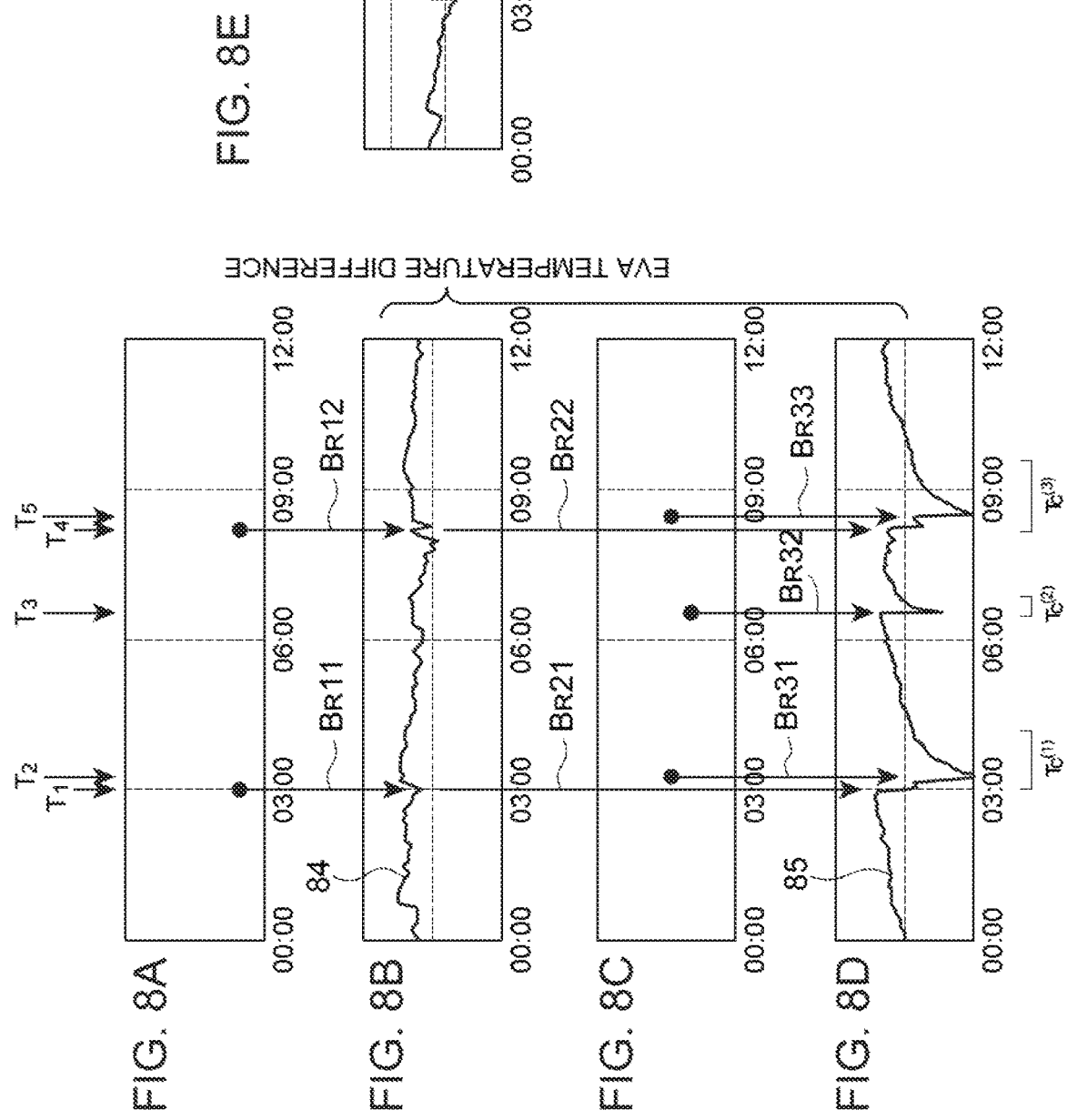

DEVICE ABNORMALITY DIAGNOSIS METHOD AND DEVICE ABNORMALITY DIAGNOSIS DEVICE

TECHNICAL FIELD

The present disclosure relates to an abnormality diagnosis method and an abnormality diagnosis device for diagnosing an abnormality of a device on the basis of information collected from the device in operation.

BACKGROUND ART

Generally, to monitor whether at least one device constituting a plant is normally operated, state amounts such as the temperature and the pressure of a device are obtained from the device and monitored. In a specific method, state amounts of a plurality of monitoring items, which are monitoring targets of the device, are measured at a predetermined time interval, and a Mahalanobis distance is calculated by focusing on the correlation between the state amounts of the plurality of monitoring items. Then, it is determined whether there is a sign of abnormality in the plant, on the basis of the Mahalanobis distance.

In the abnormality diagnosis method using the Mahalanobis distance, to improve the abnormal detection accuracy, the Mahalanobis distance is calculated by excluding state amounts which are substantially unnecessary in abnormal diagnosis and state amounts that do not contribute to improvement of the abnormality diagnosis accuracy. Patent Document 1 discloses an abnormality diagnosis method for a device using the Mahalanobis distance calculated on the basis of the above idea. In the abnormality diagnosis method disclosed in Patent Document 1, a frequency distribution of data is obtained for each state amount from data collected in a time-series manner from the device for each of the plurality of state amounts, and abnormality diagnosis is performed by using the Mahalanobis distance calculated by excluding a state amount whose frequency distribution of data does not follow the normal distribution.

CITATION LIST

Patent Literature

Patent Document 1: JP2013-200245A

SUMMARY

Problems to be Solved

However, if the Mahalanobis distance is calculated by fully excluding the entire data collected from a part of state amounts to be excluded as in Patent Document 1, it becomes difficult to find a particular abnormality whose diagnosis requires the excluded state amount.

Furthermore, as another problem, in a case where a rapid change of the state amount of another device connected to the preceding stage of the device to be diagnosed in the plant propagates as a non-stationary change of the state amount of the device to be diagnosed, the following problem arises. That is, the non-stationary state change of the device to be diagnosed due to influence of the state change of the other device is added to the variation characteristics of the plurality of state amounts collected from the device to be diagnosed as disturbance. As a result, due to the above disturbance added to the variation characteristic of the state amounts of the device to be diagnosed, it may become difficult to appropriately find a sign of occurrence of an abnormality of the device from the variation characteristics of the state amounts of the device to be diagnosed.

In view of the above problems, an object of some embodiments of the present invention is to provide an abnormality diagnosis method capable of accurately detecting a sign of occurrence of an abnormality in a device to be diagnosed, while taking account of data collected from the device to be diagnosed for all of the state amounts, without being affected by the non-stationary change caused by propagation of a state change of another device to the device to be diagnosed.

Solution to the Problems (1) According to some embodiment of the present invention, a device abnormality diagnosis method for a device to be diagnosed constituting a plant includes: a step of obtaining time-series data of a plurality of state amounts of the plant which are correlated to an abnormality of the device to be diagnosed; a step of obtaining abnormality diagnosis data on the plurality of state amounts by performing pre-processing on at least one state amount of the plurality of state amounts to exclude, from the time-series data on the state amounts, data of the at least one state amount obtained in an exclusion period which is at least a part of a transient state period during which the device to be diagnosed is affected by a state change of another constituent device of the plant; and a step of performing abnormality diagnosis on the device to be diagnosed on the basis of the abnormality diagnosis data of the plurality of state amounts.

In the above method (1), the purpose of setting the exclusion period and excluding the data obtained in the exclusion period related to a part of the state amounts from abnormality diagnosis is as follows. In the exclusion period which is at least a part of the transient state period in which the device to be diagnosed is affected by the state change of the other constituent device, the non-stationary state change of the device to be diagnosed due to influence of the state change of the other device is added to the variation characteristics of the plurality of state amounts collected from the device to be diagnosed as disturbance. Thus, in the above method (1), from the abnormality diagnosis data for abnormality analysis, data obtained in the time range in which a part of the state amounts is affected by the state change of the other constituent device is excluded.

Thus, according to the above method (1), it is possible to detect a sign of occurrence of abnormality of the device to be diagnosed without fully excluding the entire data collected in a time-series manner from the device to be diagnosed for a part of the state amounts, and without being affected by propagation of a state change of the other constituent device.

(2) According to an illustrative embodiment, in the above method (1), the other constituent device is an abnormality prevention device disposed on the device to be diagnosed or a preceding device positioned in a preceding stage of the device to be diagnosed, and the transient state period is a period during which the device to be diagnosed is affected by operation of the abnormality prevention device.

In an example, the other constituent device which has an effect of causing a non-stationary change of the device to be diagnosed by affecting the device to be diagnosed may be the abnormality prevention device provided to prevent occurrence of an abnormality of the device to be diagnosed. Furthermore, if an abnormality prevention device is disposed on a preceding device disposed in the preceding stage (upstream side) of the device to be diagnosed, the influence of the state change that occurs in the preceding device due to operation of the abnormality prevention device may further propagate to a downstream device to be diagnosed, and cause a state change of the device to be diagnosed.

Thus, in the above method (2), from the abnormality diagnosis data for abnormality analysis, data obtained in a period in which the device to be diagnosed is affected by operation of the abnormality prevention device provided for the preceding device and/or the device to be diagnosed is excluded. In this way, according to the above method (2), it is possible to accurately detect a sign of occurrence of abnormality of the device to be diagnosed without being affected by propagation of the state change of the other constituent device.

(3) According to an illustrative embodiment, in the above method (1) or (2), the step of obtaining the abnormality diagnosis data includes: determining a length of the exclusion period on the basis of a response characteristic of the at least one state amount after start of the state change of the other constituent device; and excluding, from the time-series data, data of the at least one state amount obtained within the exclusion period set on the basis of the response characteristic.

In the above method (3), the exclusion period is set on the basis of the response characteristic shown in the temporal change of the at least one state amount after start of a state change of the other constituent device. Thus, according to the above method (3), in a case where the response characteristics indicate a high response, it is possible to set the exclusion period to be accordingly short. On the other hand, if the response characteristics indicate a slow response, it is possible to set the exclusion period to be accordingly long.

(4) In an illustrative embodiment, in the above method (3), when setting the length of the exclusion period on the basis of the response characteristic, the length of the exclusion period is determined by applying a time constant obtained from a temporal change of the at least one state amount obtained after start of the state change of the other constituent device to a pre-set correlation between the time constant, which indicates the response characteristic of the at least one state amount after start of the state change of the other constituent device, and the length of the exclusion period.

In the above method (4), in a case where the response characteristic of the at least one state amount after start of the state change of the other constituent device indicates a quick response, the time constant indicating the response characteristic should be small. In a case where the response characteristic indicates a low response, the time constant indicating the response characteristic should be large. Thus, in the above method (4), the correlation between the time constant indicating the response characteristic and the length of the exclusion period is set in advance, and the exclusion period corresponding to the magnitude of the time constant is set on the basis of the correlation. Thus, according to the above method (4), it is possible to set an appropriate length for the exclusion period in accordance with the magnitude of the time constant.

(5) According to an illustrative embodiment, in the above method (1) or (2), the step of obtaining the abnormality diagnosis data includes determining a length of the exclusion period so as to reduce a difference between a frequency distribution and a normal distribution related to the time-series data of the at least one state amount.

In the above method (1) or (2), the data in the exclusion period excluded from abnormality diagnosis is data obtained in a transient time range in which a part of the state amounts is affected by a state change of the other constituent device. Thus, even in a case where data collected in a period other than the exclusion period from the device in relation to the plurality of state amounts is distributed according to the normal distribution, the data of the state amount collected in the exclusion period may not necessarily be distributed according to the normal distribution.

Thus, in the above method (5), the length of the exclusion period is determined so as to reduce the difference between the frequency distribution and the normal distribution related to the data obtained in relation to the at least one state amount. Thus, according to the above method (5), it is possible to set the exclusion period as a transient time range in which the state amount is affected by a state change of the other constituent device (a period in which the frequency distribution is offset from the normal distribution), and the data obtained in this period is not used in the abnormality diagnosis, which makes it possible to perform abnormality diagnosis accurately.

(6) According to an illustrative embodiment, in the above method (5), the step of obtaining the abnormality diagnosis data includes determining the length of the exclusion period on the basis of an index indicating consistency between the frequency distribution and the normal distribution.

According to the above method (6), when setting the length of the exclusion period, an index of consistency between the frequency distribution and the normal distribution is taken into account, and thus it is possible to more accurately identify a transient time range during which the state amount is affected by a state change of the other constituent device, by using the index. Thus, it is possible to set the exclusion period more appropriately, and to improve the accuracy of abnormal diagnosis.

(7) According to an illustrative embodiment, in the above method (1) to (6), the step of performing abnormality diagnosis on the device includes: calculating a Mahalanobis distance of the abnormality diagnosis data with reference to a unit space including the plurality of state amounts at a normal time of the device; and determining that the device has an abnormality if the Mahalanobis distance is greater than the threshold.

In the above method (7), a Mahalanobis distance of the abnormality diagnosis data is obtained with reference to a unit time including a plurality of state amounts at the time when the device to be diagnosed is normal. Thus, according to the above method (7), it is possible to evaluate quantitatively the extent of deviation of the abnormality diagnosis data not affected by operation of the abnormality prevention device from the unit space representing the state group at the time when the device to be diagnosed is normal. As a result, according to the above method (7), it is possible to diagnose an abnormality of the device with a high accuracy on the basis of the abnormality diagnosis data not affected by a state change of the other constituent device.

(8) According to some embodiments of the present invention, an abnormality diagnosis device for a device to be diagnosed disposed in a plant includes: an input/output part configured to obtain time-series data of a plurality of state amounts of the plant which are correlated to an abnormality of the device to be diagnosed from a sensor of the plant, and output a result of abnormality diagnosis of the device to be diagnosed based on the time-series data; a diagnosis data acquisition part configured to obtain abnormality diagnosis data on the plurality of state amounts by performing pre-processing on at least one state amount of the plurality of state amounts to exclude, from the time-series data on the state amounts, data of the at least one state amount obtained in an exclusion period which is at least a part of a transient state period during which a state change is caused in the device to be diagnosed by another constituent device which operates in the plant; and an abnormality diagnosis part configured to perform abnormality diagnosis on the device to be diagnosed on the basis of the abnormality diagnosis data of the plurality of state amounts.

In the above configuration (8), the purpose of setting the exclusion period and excluding the data obtained in the exclusion period related to a part of the state amounts from abnormality diagnosis is as follows. In the exclusion period which is at least a part of the transient state period in which the device to be diagnosed is affected by the state change of the other constituent device, the non-stationary state change of the device to be diagnosed due to influence of the state change of the other device is added to the variation characteristics of the plurality of state amounts collected from the device to be diagnosed as disturbance. Thus, in the above configuration (8), from the abnormality diagnosis data for abnormality analysis, data obtained in the time range in which a part of the state amounts is affected by the state change of the other constituent device is excluded.

Accordingly, with the above configuration (8), it is possible to detect a sign of occurrence of abnormality of the device to be diagnosed without fully excluding the entire data collected in a time-series manner from the device to be diagnosed for a part of the state amounts, and without being affected by propagation of the state change of the other constituent device.

Advantageous Effects

According to some embodiment of the present invention, it is possible to accurately detect a sign of occurrence of an abnormality in a device to be diagnosed, while taking account of data collected from the device to be diagnosed for all of the state amounts, without being affected by the non-stationary change caused by propagation of the state change of another device to the device to be diagnosed.

BRIEF DESCRIPTION OF DRAWINGS

FIG. 6A is a diagram showing an example of determining an appropriate exclusion period in accordance with the response characteristics of the device state with respect to operation of an abnormality prevention device.

FIG. 6B is a diagram showing an example of determining an appropriate exclusion period in accordance with the response characteristics of the device state with respect to operation of an abnormality prevention device.

FIGS. 8A to 8E are diagrams showing the second example of setting an exclusion period on die basis of influence of operation of an abnormality prevention device with respect to a temporal change of the device state.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of an equal state such as "same" "equal" and "uniform" shall not be construed as indicating only the state in which the feature is strictly equal, but also includes a state in which there is a tolerance or a difference that can still achieve the same function. On the other hand, an expression such as "comprise", "include", "have", "contain" and "constitute" are not intended to be exclusive of other components.

Hereinafter, firstly, from among a plurality of constituent devices of a plant, a device to be diagnosed by abnormality diagnosis and an abnormality diagnosis device for performing abnormality diagnosis on the device to be diagnosed will be described with reference to FIGS. 1 to 3. Next, with reference to FIGS. 3 to 9, a processing method to be performed by the abnormality diagnosis device in the plant for abnormality diagnosis of the device to be diagnosed will be described. Finally, according to some embodiments of the present invention, with reference to FIG. 10, an IGCC plant for performing the device abnormality diagnosis with the abnormality diagnosis device will be described.

First, with reference to FIG. 1, an articulated device group 32b will be described, which is a part of a plant and includes at least one device 1 to be diagnosed by abnormality diagnosis. As shown in FIG. 1, the articulated device group 32b includes a plurality of devices 1C to 1X and a plurality of devices 5C to 5X articulated therein. In the articulated device group 32b shown in FIG. 1, the devices 1 to be diagnosed by abnormality diagnosis are the plurality of devices 1C to 1X, and the plurality of devices 5C to 5X are each an abnormality prevention device for preventing abnormality of corresponding one of the devices 1C to 1X.

Figure 1:
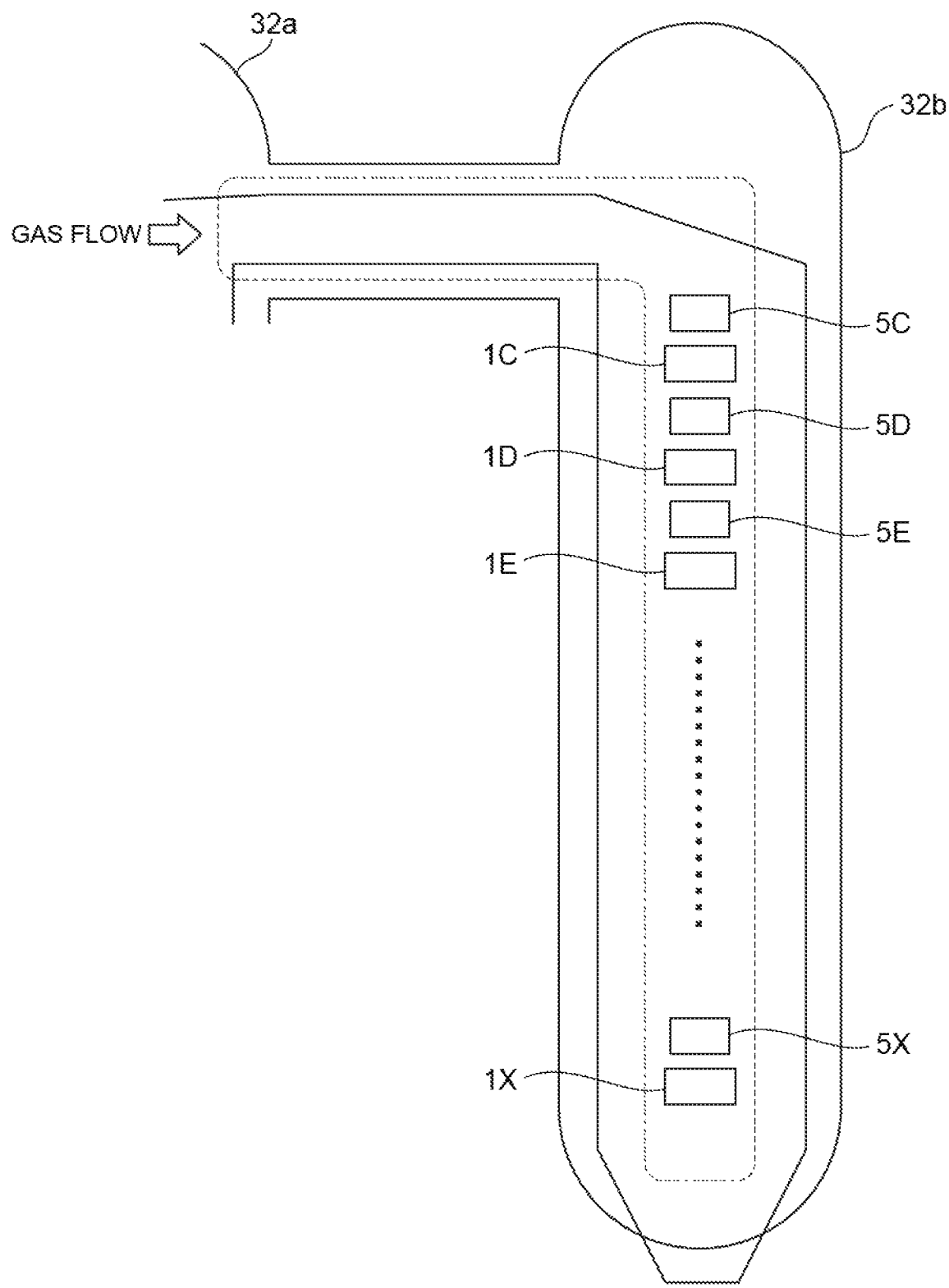
FIG. 1 is a diagram showing a part of a plant for applying an abnormality diagnosis method according some embodiments of the present invention.

For instance, in the example shown in FIG. 1, the device 5C, the device 5D, the device 5E, . . . , are disposed immediately above the device 1C, the device 1D, the device 1E respectively. Further, the device 5C, the device 5D, and the device 5E, . . . , are abnormality prevention devices provided to prevent the abnormality of the device 1C, the device 1D, the device 1E, . . . , respectively.

From among the plurality of devices 1C to 1X shown in FIG. 1, the output of a preceding device 1' disposed upstream is transmitted to a subsequent device 1" disposed downstream. For instance, provided that the device 1C is the preceding device 1' disposed upstream and the device 1D is the subsequent device 1" disposed downstream, the output of the device 1C is transmitted to the device 1D. Further, specific examples of output from the preceding device 1' may include displacements of a fluid generated by the preceding device 1' and the physical amounts outputted from the preceding device 1' (fluid pressure, gas pressure, temperature, voltage, mechanical action). Furthermore, the output from the preceding device 1' may be a state change at the preceding device 1' propagating to the output side with a response delay (e.g. wave propagation or energy propagation). In the following description, one of the plurality of devices 1C to 1X constituting the articulated device group 32b in FIG. 1 is regarded as the device 1 to be diagnosed by abnormality diagnosis.

Figure 2:
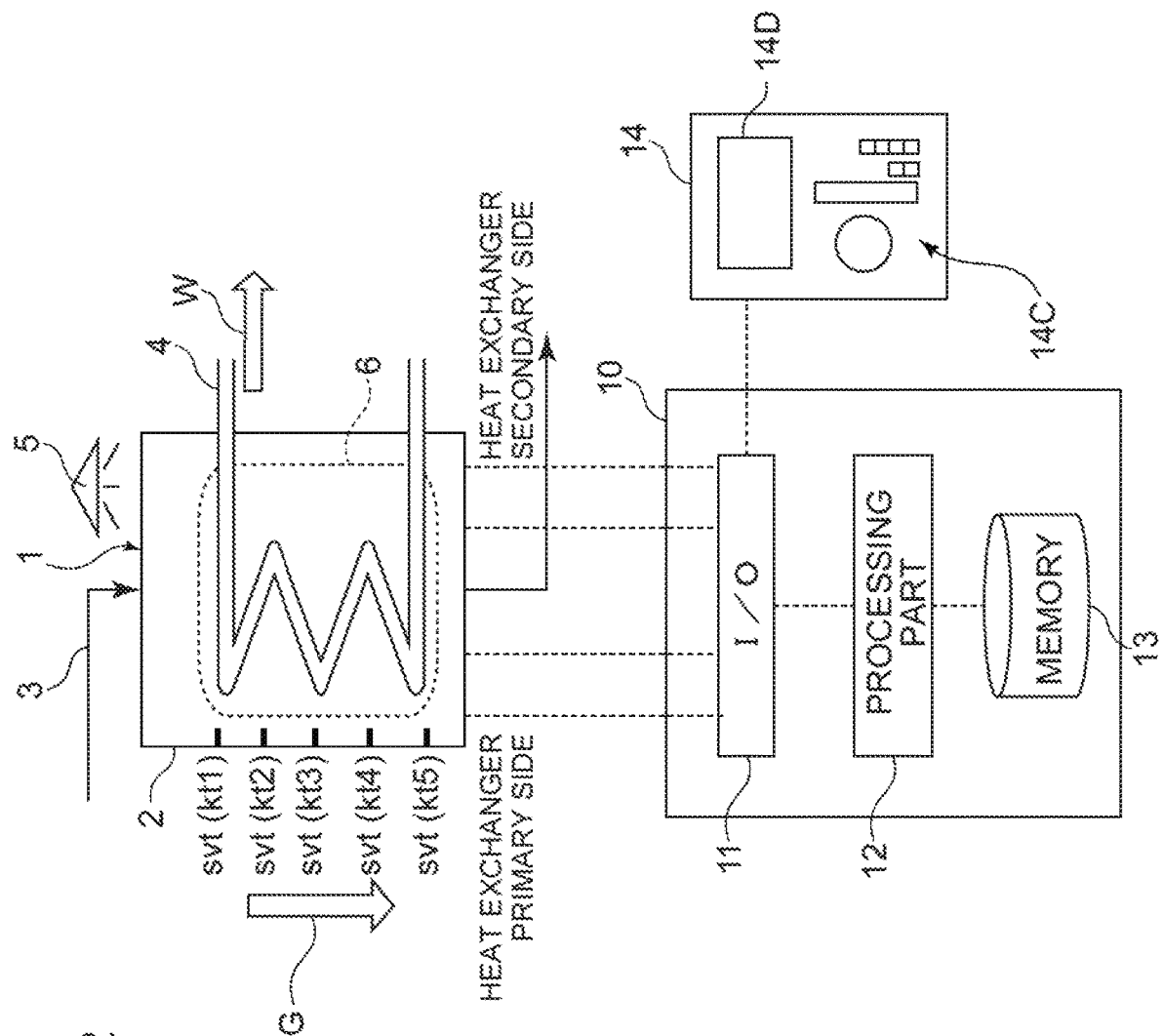
FIG. 2 is a diagram showing a device to be diagnosed and an abnormality diagnosis device for the device to be diagnosed, according to some embodiments of the present invention.

FIG. 2 shows a configuration of the device 1 to be diagnosed by abnormality diagnosis and the abnormality diagnosis device 10 for diagnosing an abnormality of the device 1 to be diagnosed. In an example, the device 1 to be diagnosed may be one of the plurality of devices 1C to 1X constituting the articulated device group 32b in FIG. 1. In this case, the abnormality prevention device 5 shown in FIG. 2 may be an abnormality prevention device 5 disposed immediately above the device 1 to be diagnosed, in the articulated device group 32b in FIG. 1. For instance, in the articulated device group 32b shown in FIG. 1, provided that the device 1E is the device 1 to be diagnosed by abnormality diagnosis, the abnormality prevention device 5 for preventing abnormality of the device 1 to be diagnosed may be the abnormality prevention device 5E disposed immediately above the device 1E. Meanwhile, the embodiment described below with reference to FIGS. 2 to 8 is for solving the problem due to provision of the abnormality prevention device 5 for abnormality prevention of the device 1 to be diagnosed.

Further, in the embodiment shown in FIG. 2, the abnormality diagnosis device 10 diagnoses presence or absence of an abnormality of each of at least one device 1 to be diagnosed, while monitoring the operation state of the at least one device 1 to be diagnosed constituting the plant. The abnormality diagnosis device 10 is, for instance, a computer including an input/output part (I/O) 11, a processing part 12, and a memory part 13. In an illustrative embodiment, the abnormality diagnosis device 10 may include a computer, or combination of a central processing unit (CPU) and a memory.

The processing part 12 receives data of a plurality of state amounts sv (k) (1≤k≤K) including the state amount of the device 1 to be diagnosed, from a plurality of sensors which are various state amount detection units mounted to at least one device constituting the plant, via the input/output part 11. The various state amount detection units obtain data of the corresponding state amount sv (k) (1≤k≤K) at a predetermined time interval from start, and input the same to the processing part 12 via the input/output part 11. The data group showing the plurality of state amounts sv (k) (1≤k≤K) is transmitted to the processing part 12 of the abnormality diagnosis device 10 in the form of electrical signals. The processing part 12 includes, for instance, a CPU, and reads in a sequence of instructions called a program (computer program) on the memory part 13, interprets the same, and moves and processes data according to the sequence of instructions.

A terminal device 14 is connected to the input/output part 11 of the abnormality diagnosis device 10. The terminal device 14 includes a display 14D, and an input unit 14C for inputting instructions for the abnormality diagnosis device 10. The memory part 13 of the abnormality diagnosis device 10 stores a computer program, data, and the like for implementing the monitoring/operating method for the device 1 to be diagnosed shown in FIG. 2. The processing part 12 uses the computer program and data to implement the monitoring/operating method for the device 1 to be diagnosed shown in FIG. 2, or to control operation of the device 1 to be diagnosed.

Figure 3:
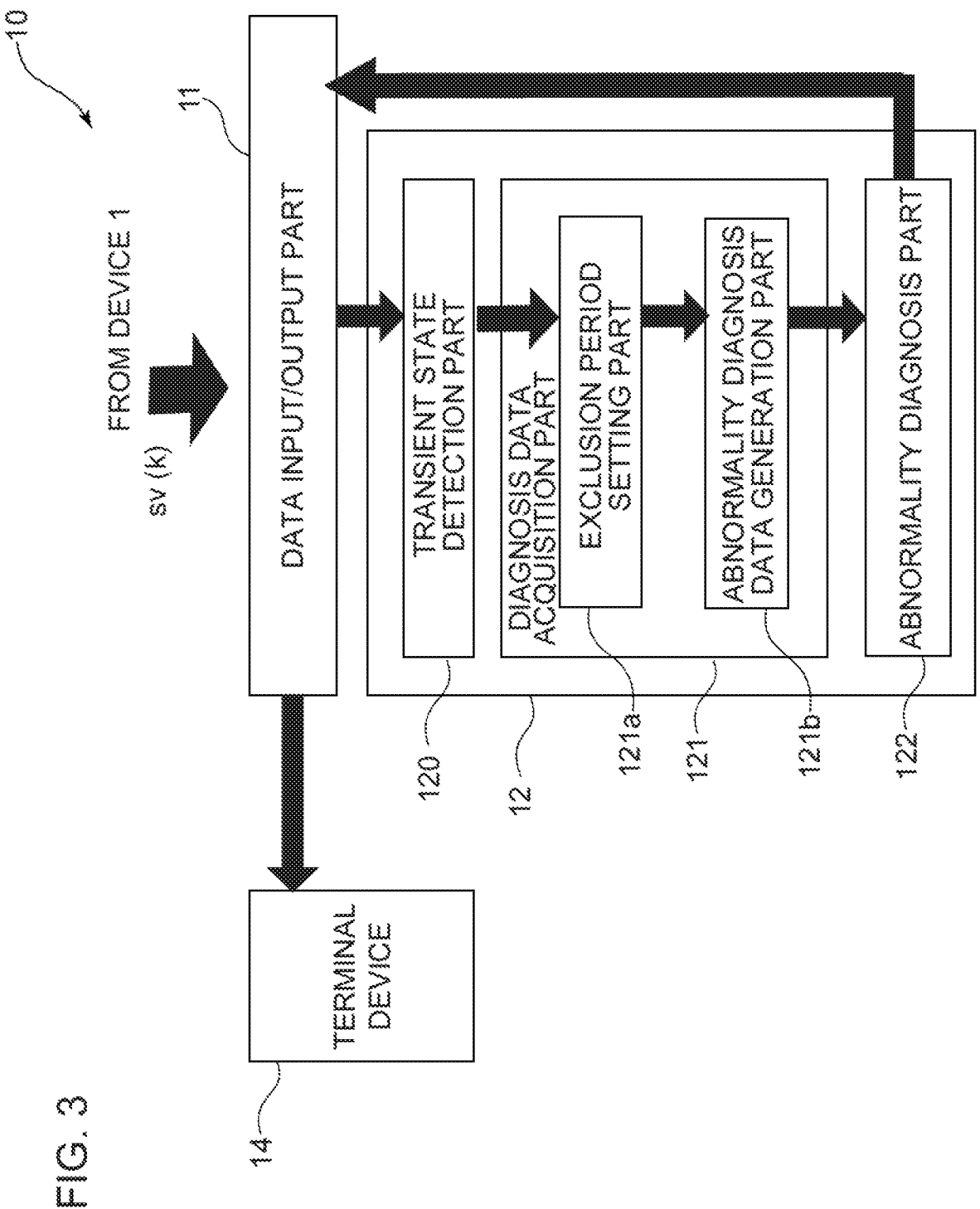
FIG. 3 is a diagram showing an interior configuration of a processing part of an abnormality diagnosis device according to some embodiments of the present invention.

FIG. 3 is a detailed interior configuration of the processing part 12 of the abnormality diagnosis device 10 shown in FIG. 2. With reference to FIG. 3, the processing part 12 includes a transient state detection part 120, a diagnosis data acquisition part 121, and an abnormality diagnosis part 122. Furthermore, the diagnosis data acquisition part 121 includes an exclusion period setting part 121a and a diagnosis data generation part 121b. The input/output part 11 of the abnormality diagnosis device 10 obtains time-series data of a plurality of state amounts sv (k) (1≤k≤K) correlated to abnormality of the device 1 to be diagnosed, from sensors disposed on a plurality of devices disposed inside the plant. As the input/output part 11 obtains time-series data of the plurality of state amounts sv (k) (1≤k≤K), the transient state detection part 120, the diagnosis data acquisition part 121, and the abnormality diagnosis part 122 perform the following operation.

First, the transient state detection part 120 performs the following process on at least one state amount sv (ka) (ka=k1, k2, . . . ) of the plurality of state amounts sv (k) (1≤k≤K). That is, the transient state detection part 120 detects the start of the transient state period τt during which a state change of the state amount sv (ka) occurs in the device 1 to be diagnosed due to influence from another device operating inside the plant. Further, the other device which causes a state change of the device 1 to be diagnosed by affecting the device 1 to be diagnosed in the plant 1 may be the abnormality prevention device 5 provided for abnormality prevention of the device 1 to be diagnosed. Further, the other device may be an abnormality prevention device 5' provided to prevent abnormality of the preceding device 1' positioned on the preceding stage (upstream side) of the device 1 to be diagnosed. In this case, the transient state period τt detected by the transient state detection part 120 is a period during which the device 1 to be diagnosed is affected by operation of the abnormality prevention device 5 or the abnormality prevention device 5'.

For instance, in the articulated device group 32b shown in FIG. 1, provided that the device 1E is the device 1 to be diagnosed, the abnormality prevention device 5 for preventing abnormality of the device 1 to be diagnosed is the abnormality prevention device 5E disposed immediately above the device 1E. Furthermore, in the articulated device group 32b shown in FIG. 1, provided that the device 1E is the device 1 to be diagnosed, the preceding device 1' positioned in the preceding stage (upstream side) of the device 1 to be diagnosed is the device 1D and the device 1C. In this case, the abnormality prevention device 5' provided to prevent occurrence of an abnormality of the preceding device 1D and the preceding device 1C is the abnormality prevention device 5D and the abnormality prevention device 5C disposed immediately above the device 1D and the device 1C. Thus, in the articulated device group 32b shown in FIG. 1, the transient state period τt detected by the transient state detection part 120 is a period during which the device 1E to be diagnosed is affected by operation of the abnormality prevention device 5E, 5D, or 5C. Furthermore, a specific example of detection of start of the transient state period τt by the transient state detection part 120 will be described below.

Next, the diagnosis data acquisition part 121 performs the following pre-processing on the state amount sv (ka) (ka=k1, k2, . . . ). The pre-processing is a processing of excluding the data de (ka) of at least one state amount sv (ka) obtained in an exclusion period τe which is at least a part of the transient state period τt detected by the transient state detection part 120, from the time-series data ds (ka) of the state amount sv (ka). Further, the diagnosis data acquisition part 121 generates the time-series data obtained by excluding the data de (ka) obtained in the exclusion period τe from the time-series data ds (ka) on the state amount sv (ka) as abnormality diagnosis data dd (k) of the plurality of state amounts sv (k) (1≤k≤K).

At this time, the exclusion period setting part 121a of the diagnosis data acquisition part 121 performs a process of appropriately setting the exclusion period τe by the following method, with reference to FIGS. 5 to 8. Further, the diagnosis data generation part 121b of the diagnosis data acquisition part 121 performs a process of generating abnormality diagnosis data dd (k) by excluding the data de (ka) obtained in the exclusion period τe set by the exclusion period setting part 121a from the time-series data ds (ka) of the state amount sv (ka).

Furthermore, when receiving the abnormality diagnosis data dd (k) of the plurality of state amounts sv (k) (1≤k≤K) from the diagnosis data acquisition part 121, the abnormality diagnosis part 122 performs abnormality diagnosis of the device 1 to be diagnosed, on the basis of the abnormality diagnosis data dd (k) of the plurality of state amounts sv (k) (1≤k≤K). The result of abnormality diagnosis of the device 1 to be diagnosed by the abnormality diagnosis part 122 is outputted to the terminal device 14 via the input/output part 11.

Figure 4:
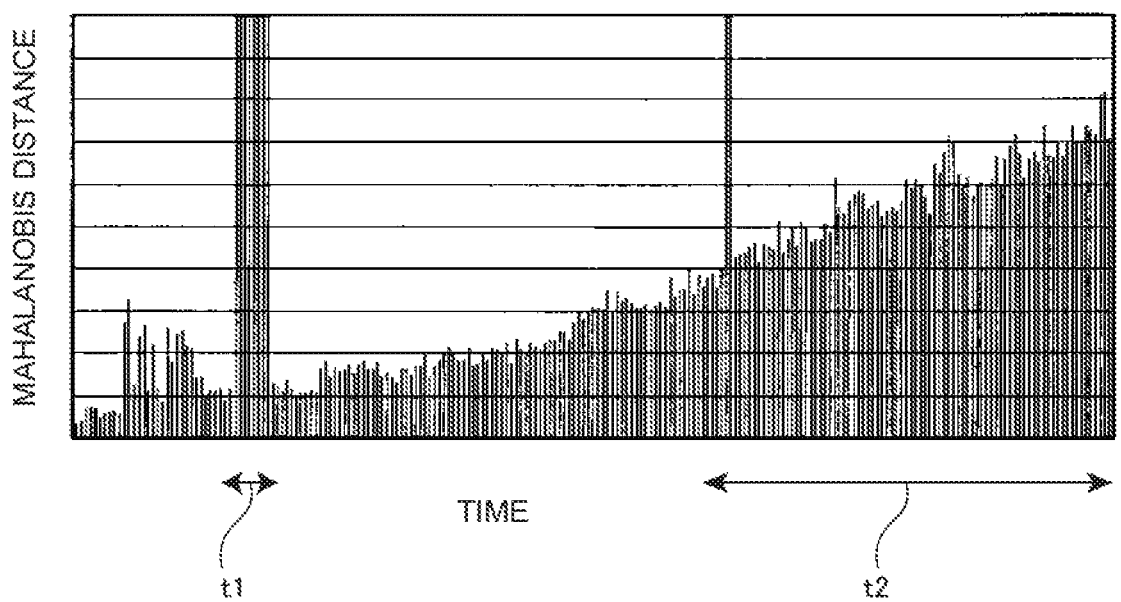
FIG. 4 is a diagram showing a change of the Mahalanobis distance with time.

Hereinafter, in the above configuration of the abnormality diagnosis device 10 shown in FIGS. 2 and 3, the purpose of setting the exclusion period τe and excluding the data de (ka) obtained in the exclusion period τe related to a part of the state amounts sv (ka) from abnormality diagnosis will be described. First, to clarify the problem of not excluding the data de (ka) obtained in the exclusion period τe from abnormality diagnosis, a comparative example will be described with reference to FIG. 4, in comparison to the embodiment shown in FIGS. 2 and 3. Further, in the following description, the abnormality prevention device provided to prevent abnormality of the preceding device 1' positioned upstream of the device 1 to be diagnosed will be referred to as the abnormality prevention device 5'. FIG. 4 is a diagram showing the temporal change of the Mahalanobis distance in a case where a MT method based on the Mahalanobis distance is used as an abnormality diagnosis method. In the example shown in FIG. 4, the Mahalanobis distance is calculated without excluding the data de (ka) obtained in the exclusion period τe set by the exclusion period setting part 121a, from the data ds (k) of the state amounts sv (k) (1≤k≤K) of the device 1 to be diagnosed.

In FIG. 4, at time t1, the Mahalanobis distance obtained from actual data of the state amount sv (k) (1≤k≤K) of the device 1 to be diagnosed increases extremely, because the operation state of the device 1 to be diagnosed is abnormal, and the state amount sv (k) of the device 1 to be diagnosed is deviated from the unit space considerably. Further, at time t2, even though the operation state of the device 1 to be diagnosed is normal, the Mahalanobis distance increases extremely due to the non-stationary state change added as turbulence to the state amount sv (k) of the device 1 to be diagnosed, and the state amount sv (k) of the device 1 to be diagnosed is deviated from the unit space considerably.

Thus, unless excluding the influence of the non-stationary state change added as turbulence to the state amount sv (k) of the device 1 to be diagnosed, an abnormality may be wrongly detected in the abnormality diagnosis of the device 1 to be diagnosed. The reason of the Mahalanobis distance increasing extremely even though the operation state of the device 1 to be diagnosed is normal at time t2 in FIG. 4 can be described as follows.

In the MT method, accurate abnormality diagnosis can be performed on the basis of the Mahalanobis distance only if the actual data of the state amount sv (k) (1≤k≤K) of the device 1 to be diagnosed by abnormality diagnosis is distributed following the normal distribution. That is, in the MT method, accurate abnormality diagnosis can be performed only if the state amount sv (k) (1≤k≤K) of the device 1 to be diagnosed can be approximated appropriately by a random variable which randomly changes in accordance with a stationary probability distribution.

However, if influence due to operation of the abnormality prevention device 5 or 5' of the device 1 to be diagnosed is added to a part of the state amounts sv (ka) of a part of the device 1 to be diagnosed as turbulence, a non-stationary state change is applied to a part of the state amounts sv (ka). As result, in the transient state period τt until the turbulence applied to the state amount sv (ka) due to operation of the abnormality prevention device 5 or 5' attenuates, the above non-stationary state change raises the following inconvenience. That is, for the state amount sv (k) (1≤k≤K) of the device 1 to be diagnosed is distributed according to a non-normal distribution, it is no longer possible to approximate with a random variable which randomly changes in accordance with a stationary probability distribution. Thus, even if the operation state of the device 1 to be diagnosed is not abnormal, the state amount sv (k) of the device 1 to be diagnosed observed in the transient state period τt may deviate greatly from the unit space.

Also in the case of the device 1 to be diagnosed shown in FIG. 1, in the exclusion period τe including the time immediately after operation of the abnormality prevention device 5 or 5', the non-stationary state change due to operation of the abnormality prevention device 5 or 5' is added to the variation characteristics of the plurality of state amounts sv (k) (1≤k≤K) collected from the device 1 to be diagnosed as turbulence. Thus, with the above configuration, from the abnormality diagnosis data dd (k) (1≤k≤K) for abnormality analysis, data obtained in the time range τe in which a part of the state amounts sv (ka) is affected by influence of turbulence due to operation of the abnormality prevention device 5 or 5' is excluded.

Accordingly, with the above configuration, it is possible to detect a sign of occurrence of abnormality of the device 1 to be diagnosed without fully excluding the entire data collected in a time-series manner from the device for a part of the state amount sv (ka), and without being affected by turbulence due to operation of the abnormality prevention device 5 or 5'.

In an illustrative embodiment, the articulated device group 32b including the device 1 to be diagnosed may be a gas cooler shown in FIG. 1. In the example shown in FIG. 1, the gas cooler 32b forms a coal gasification furnace 32 of the IGCC plant with a coal gasification part 32a. The coal gasification part 32a combusts a carbon including fuel which includes powdered coal supplied from a powdered coal supplying facility to produce fuel gas, and supplies the fuel gas to the upper section of the gas cooler 32b. The fuel gas supplied from the coal gasification part 32a flows from the top section to the bottom section inside the gas cooler 32b, and the gas cooler 32*b* produces steam through heat exchange between fuel gas (carbon containing fuel gas) and water flowing inside the gas cooler 32*b*. Accordingly, the gas cooler 32*b* cools fuel gas produced in the gasification furnace 32, and supplies the produced steam to the steam turbine to drive the steam turbine.

Furthermore, each of the devices 1C to 1X of the gas cooler 32*b* shown in FIG. 1 may be the carbon containing fuel heat exchanger 1 shown in FIG. 2. The carbon containing fuel heat exchanger 1 is a heat exchanger that performs heat exchange between a primary side fuel and a secondary side heat exchanging medium (e.g. water) when the primary side is supplied with a coal containing fuel (e.g. coal containing fuel gas produced by the coal gasification furnace 32 from a coal containing fuel). That is, the gas cooler 32*b* shown in FIG. 1 exchanges heat between fuel gas from the coal gasification part 32*a* and water being a heat exchanging medium with a plurality of coal containing fuel heat exchangers 1C to 1X provided therein, and supplies the produced water vapor to the steam turbine. Furthermore, soot removing devices 5C to 5X are disposed directly above corresponding coal containing fuel heat exchangers 1C to 1X disposed inside the gas cooler 32*b*. Each of the soot removing devices 5C to 5X is an abnormality prevention device 5 for preventing abnormality of each of the coal containing fuel heat exchangers 1C to 1X. As described below in detail, each of the soot removing devices 5C to 5X intermittently performs operation for preventing a decrease with time in the heat exchange efficiency of the coal containing fuel heat exchangers 1C to 1X provided immediately below the respective soot removing devices 5C to 5X. Furthermore, as shown in FIG. 2, the coal containing fuel heat exchanger 1 to be diagnosed by abnormality diagnosis includes a soot removing device 5 as an abnormality prevention device 5, as well as a heat exchanger 2, a fuel flow passage 3, and a heat-transfer tube 4.

Hereinafter, with reference to FIG. 2, the internal configuration of each coal containing fuel heat exchanger 1 will be described.

In the carbon containing fuel heat exchanger 1 shown in FIG. 2, the coal containing fuel is supplied into the heat exchanger 2 via the fuel flow passage 3. As an example of coal containing fuel, a coal containing fuel gas and a powdered fuel can be named. The heat-transfer tube 4 is disposed through the inside of the heat exchanger 2, thereby forming a heat transfer surface 6. On the heat transfer surface 6, heat is exchanged between a fuel flowing from the fuel flow passage 3 to the heat exchanger 2, and a heat exchange medium flowing through the heat-transfer tube 4. An example of the heat exchange medium includes water, for instance. Furthermore, the soot removing device 5 removes soot due to carbon in the fuel adhering to the heat transfer surface 6 formed by the heat-transfer tube 4. The soot removing device 5 may be an oscillation type soot removing device which applies oscillation to the heat transfer surface 6, a hard ball dropping soot removing device which drops a hard ball on the heat transfer surface 6, or an injection type soot removing device (e.g. soot blower) which injects compressed gas (nitrogen, steam) to the heat transfer surface 6, for instance.

Further, in some embodiments described below, the following assumption is made to simplify the description. First, the device 1 to be diagnosed by abnormality diagnosis is the carbon containing fuel heat exchanger 1 shown in FIG. 2, which includes the soot removing device 5 as the abnormality prevention device 5 for preventing abnormality of the carbon containing fuel heat exchanger 1. Further, in some embodiments described below, provided that the carbon containing fuel heat exchanger 1E shown in FIG. 1 is the device 1 to be diagnosed, only the influence of operation of the soot removing device 5E disposed directly above the carbon containing fuel heat exchanger 1E on the state amount of the carbon containing fuel heat exchanger 1 is taken into account. That is, as influence from another device which causes a state change of the carbon containing fuel heat exchanger 1, only the influence of operation of the soot removing device 5, which directly removes soot from the carbon containing fuel heat exchanger 1, on the state amount of the carbon containing fuel heat exchanger 1 is taken into account.

The state amount sv (k) (1≤k≤K) for monitoring the carbon containing fuel heat exchanger 1 may include, for instance, the temperatures of a plurality of positions in the flow direction G on the primary side of the heat exchanger 2 (e.g. inlet temperature and outlet temperature of the heat exchanger 2), the differential pressure of the inlet and outlet in the flow direction G of the primary side, the flow rate of the primary side, the plurality of temperatures in the flow direction W on the secondary side, and the flow rate of the heat exchange medium in the heat-transfer tube 4. The primary side of the heat exchanger 2 refers to the high temperature side. That is, in the embodiment shown in FIG. 1, the primary side of the heat exchanger 2 refers to the side where the fuel is flowing. Furthermore, the secondary side of the heat exchanger 2 refers to the low temperature side. That is, the secondary side of the heat exchanger 2 refers to the side where the heat exchange medium flows. Further, the state amounts sv (k) (1≤k≤K) are shown as data to be monitored.

Thus, in this embodiment, as a state amount that causes a state change in response to influence of operation of the soot removing device 5, the temperatures svt (k) (kt=kt1, kt2, kt3, . . . ) of a plurality of locations along the flow direction G of the primary side of the heat exchanger 2 may be used. The reason is as follows. In the carbon containing fuel heat exchanger 1 shown in FIG. 1, when soot accumulates on the heat transfer surface 6 of the heat exchanger 2, the efficiency of heat exchange on the heat transfer surface 6 deteriorates. Thus, the temperature of fuel is less likely to decrease at the primary side of the heat exchanger 2. At this time, the values of the temperatures svt (k) (kt=kt1, kt2, kt3, . . . ) at the plurality of locations arranged along the flow direction G on the primary side of the heat exchanger 2 are different from those measured during normal operation of the heat exchanger 2. On the other hand, when soot accumulating on the heat transfer surface 6 is removed by operation of the soot removing device 5, the efficiency of heat exchange on the heat transfer surface 6 improves at once, and thus the temperature of fuel decreases at a greater rate on the primary side of the heat exchanger 2. Thus, after operation of the soot removing device 5, the values of the temperatures svt (k) (kt=kt1, kt2, kt3, . . . ) at the plurality of locations arranged along the flow direction G on the primary side of the heat exchanger 2 change in response to influence of improvement of the heat exchange efficiency.

Furthermore, as a state amount that causes a state change in response to influence of operation of the soot removing device 5, the temperatures svt (u) (ku=ku1, ku2, ku3, . . . ) of at least one point along the flow direction W on the secondary side of the heat exchanger 2 may be further used, in addition to the temperatures svt (kt) at a plurality of positions in the flow direction G on the primary side of the heat exchanger 2. The reason is as follows. As soot accumulates on the heat transfer surface 6, the efficiency of heat exchange between the fuel and the heat exchange medium decreases, and thus the temperature at a point of the secondary side of the heat exchanger 2 decreases. However, after operation of the soot removing device 5, when soot on the heat transfer surface 6 is removed and the efficiency of the heat exchange between the fuel and the heat exchange medium is improved, the temperature svu (ku) of at least one location in the flow direction W of the secondary side of the heat exchanger 2 rapidly increases.

Accordingly, in the exclusion period τe, which is at least a part of the transient state period τt immediately after operation of the soot removing device 5, the state change due to operation of the soot removing device 5 is added as turbulence to the variation characteristic of the temperatures (kt) at the plurality of locations in the flow direction G of the primary side of the heat exchanger 2. Furthermore, in the exclusion period τe, which is at least a part of the transient state period τt immediately after operation of the soot removing device 5, the state change due to operation of the soot removing device 5 is added as turbulence to the variation characteristic of the temperature (ku) of at least one location in the flow direction W on the secondary side of the heat exchanger 2. Thus, in the above configuration, from the abnormality diagnosis data dd (k) (1≤k≤K) for abnormality analysis, data de (ke) and/or de (ku) obtained in the time range in which a part of the state amounts svt (kt) and/or svu (ku) is affected by influence of turbulence due to operation of the soot removing device 5 is excluded.

That is, the abnormality diagnosis device 10 firstly sets an exclusion period τe, which is at least a part of the transient state period τt immediately after operation of the soot removing device 5, for at least one state amount svt (kt) and/or svu (ku) of the plurality of state amounts sv (k) (1≤k≤K). Subsequently, the abnormality diagnosis device 10 performs pre-processing of excluding, from the time-series data ds (k) of the state amount sv (k), the data de (ke) and/or de (ku) of the state amount svt (kt) and/or svu (ku) obtained in the exclusion period τe. By performing the above pre-processing, the abnormality diagnosis device 10 obtains the abnormality diagnosis data dd (k) from the time-series data ds (k) of the plurality of state amounts sv (k). For the transient state period τt starts immediately after operation of the soot removing device 5, the transient state detection part 120 may detect a control signal for switching the state of the soot removing device 5 from a stop state to an operation state, and detect start of the transient state period τt.

Thus, according to this embodiment, it is possible to detect a sign of occurrence of abnormality of the carbon containing fuel heat exchanger 1 without fully excluding the entire data collected in a time-series manner from the carbon containing fuel heat exchanger 1 for a part of the state amount svt (kt) and/or svu (ku), and without being affected by turbulence due to operation of the soot removing device 5.

According to an illustrative embodiment, in the process of obtaining the abnormality diagnosis data dd (k) with the abnormality diagnosis device 10 shown in FIGS. 2 and 3, the exclusion period setting part 121a sets the exclusion period τe on the basis of the response characteristics of the at least one state amount svt (kt) after operation of the soot removing device 5. Subsequently, the diagnosis data generation part 121b excludes, from the time series data ds (kt) obtained for the plurality of state amounts sv (k) (1≤k≤K), the data of the at least one state amount svt (kt) obtained in the exclusion period τe which is set based on the response characteristics. Herein, the exclusion period setting part 121a can set the exclusion period τe on the basis of the response characteristics of the at least one state amount svt (kt) after operation of the soot removing device 5 as follows. That is, the exclusion period setting part 121a selects the exclusion period τe from the transient state period τt, which is a period until turbulence applied to the state amount svt (kt) of the carbon containing fuel heat exchanger 1 due to operation of the soot removing device 5 after the operation point of the soot removing device 5 attenuates and falls within a predetermined range.

Hereinafter, on the basis of the response characteristics of the change of the state amount svt (kt) and/or svu (ku) that occurs in response to operation of the soot removing device 5, the method of setting the exclusion period τe by the exclusion period setting part 121a will be described in detail with reference to FIGS. 5 and 6. The exclusion period setting part 121a sets the selected exclusion period τe as follows. That is, the exclusion period setting part 121a selects the exclusion period τe from the transient state period τt, which is a period until turbulence applied to the state amount svt (kt) and/or svu (ku) of the carbon containing fuel heat exchanger 1 due to operation of the soot removing device 5 after the operation point of the soot removing device 5 attenuates and falls within a predetermined range. As described above, the state amount svt (kt) and/or svu (ku) corresponds to the temperature measured at at least one location in the flow direction G on the primary side of the heat exchanger 2 and the flow direction W on the secondary side of the heat exchanger 2, and is affected by turbulence applied by operation of the soot removing device 5.

For instance, with reference to FIG. 5, the exclusion period setting part 121a in the abnormality diagnosis device 10 determines an appropriate exclusion period τe as follows. The curve graph shown in FIG. 5 includes the first section 81 and the second section 82, where y-axis is the temperature measured at at least one location in the flow direction G on the primary side of the heat exchanger 2, and x-axis is time. Herein, the above temperature corresponding the y-axis of FIG. 5 is actual measurement data of the state amount svt (kt1) of the carbon containing fuel heat exchanger 1.

Figure 5:
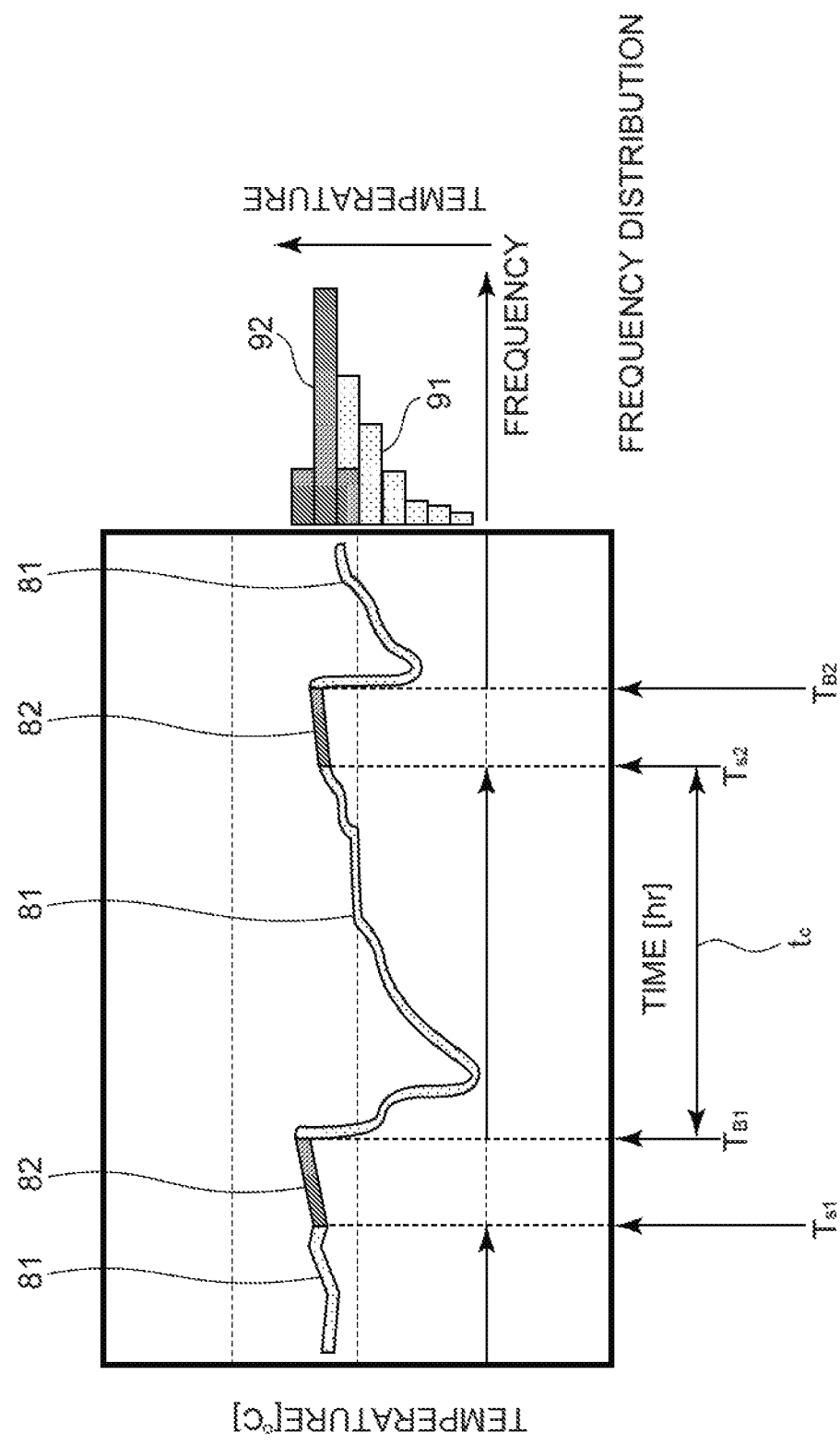
FIG. 5 is a diagram showing the first example of setting an exclusion period on the basis of influence of operation of an abnormality prevention device with respect to a temporal change of the device state.

Furthermore, at time $T_{B1}$ and time $T_{B2}$ shown in FIG. 5, the soot removing device 5 (e.g. soot blower) is in operation. Thus, in the first section 81 positioned in the time range immediately after time $T_{B1}$, temperature variation corresponding to turbulence caused by operation of the soot removing device 5 is applied. Thus, the exclusion period setting part 121a selects the exclusion period τe from the transient state period τt, which is a period until turbulence applied due to operation of the soot removing device 5 after the operation point $T_{B1}$ of the soot removing device 5 attenuates and falls within a predetermined range. For instance, as shown in FIG. 5, the influence of turbulence due to operation of the soot removing device 5 at time $T_{B1}$ is sufficiently attenuated at time $T_{S2}$, and thus the exclusion period setting part 121a selects the time range tc from the operational point $T_{B1}$ of the soot removing device 5 to time $T_{S2}$ as an exclusion period τe. Thus, according to the embodiment shown in FIG. 5, it is possible to perform abnormal diagnosis by excluding only the data de (kt1) obtained in a period affected by the influence of the turbulence due to operation of the soot removing device 5, of the data ds (k1) collected from the carbon containing fuel heat exchanger 1, in relation to the state amount svt (tk1).

Meanwhile, in the embodiment shown in FIG. 5, the duration of the transient state until the turbulence applied to the state amount svt (kt) of the carbon containing fuel heat exchanger 1 due to operation of the soot removing device 5 from time $T_{B1}$ attenuates and falls within a predetermined range can be estimated focusing on the response characteristics shown in a change of the state amount svt (kt1). Hereinafter, in the setting process of the exclusion period τe described above with reference to FIG. 5, a specific example of appropriate selection taking account of the response characteristics of the change in the state amount svt (kt1) will be described with reference to FIG. 6.

In FIG. 6A, the graph (a1) is a graph plotting time variation of the actual measurement data of the temperature svt (kt1) at a plurality of positions in the flow direction G on the primary side of the heat exchanger 2, when the load of the carbon containing fuel heat exchanger 1 is 100% (when the flow rate of the fuel flowing through the heat exchanger 2 is at maximum). Further, in FIG. 6A, the graph (a2) is a graph plotting the abnormality diagnosis data dd (kt1) obtained from the temperature change shown in (a1) of FIG. 6A, in a case where the exclusion period τe is fixed so as to be a period of one hour from the operation time $T_1$ of the soot removing device 5. Further, in FIG. 6A, the graph (a3) is a graph plotting the abnormality diagnosis data dd (kt1) obtained from the temperature change shown in (a1) of FIG. 6A, in a case where the length of the exclusion period τe starting from the operation time of the soot removing device 5 is determined on the basis of the response characteristics of the temporal change of the temperature svt (kt1).

Furthermore, in FIG. 6B, the graph (b1) is a graph plotting time variation of the actual measurement data of the temperature svt (kt1) at a plurality of positions in the flow direction G on the primary side of the heat exchanger 2, when the load of the carbon containing fuel heat exchanger 1 is 50% (when the flow rate of the fuel flowing through the heat exchanger 2 is at half the maximum). Further, in FIG. 6B, the graph (b2) is a graph plotting the abnormality diagnosis data dd (kt1) obtained from the temperature change shown in (b1) of FIG. 6B, in a case where the exclusion period τe is fixed so as to be a period of one hour from the operation time $T_1$ of the soot removing device 5. Further, in FIG. 6B, the graph (b3) is a graph plotting the abnormality diagnosis data dd (kt1) obtained from the temperature change shown in (b1) of FIG. 6B, in a case where the length of the exclusion period τe starting from the operation time of the soot removing device 5 is determined on the basis of the response characteristics of the temporal change of the temperature svt (kt1).

In an illustrative exclusion period, to obtain the abnormality diagnosis data dd (kt1) shown in (a3) of FIG. 6A and (b3) of FIG. 6B, the exclusion period τe may be determined as follows in accordance with the response characteristics of the temporal change of the temperature svt (kt1). That is, when setting the exclusion period τe on the basis of the response characteristics of the temporal change of the temperature svt (kt1), the length of the exclusion period τe may be determined as follows. First, a time constant τr indicating the response characteristics of at least one state amount svt (kt) after operation of the soot removing device 5 is obtained. Next, the time constant τr obtained from the temporal change of the at least one state amount svt (kt1) obtained after operation of the soot removing device 5 may be applied to a pre-set correlation between the time constant τr and the exclusion period τe, thereby determining the length of the exclusion period τe.

According to this embodiment, in a case where the response characteristic of the at least one state amount svt (kt1) after operation of the soot removing device 5 indicates a quick response, the time constant τr indicating the response characteristics should be also small. In a case where the response characteristic indicates a slow response, the time constant τr indicating the response characteristic should be also large. Thus, in this embodiment, the correlation between the time constant indicating the response characteristic and the length of the exclusion period τe is set in advance, and the exclusion period τe corresponding to the magnitude of the time constant τr is set on the basis of the correlation. Thus, according to this embodiment, it is possible to set an appropriate length for the exclusion period in accordance with the magnitude of the time constant τr.

From another perspective, the criteria for determining the length of the exclusion period τe according to this embodiment can be described as follows. In this embodiment, the response characteristic is used to estimate a decrease with time in the amplitude of turbulence applied to the state amount svt (kt1) of the carbon containing fuel heat exchanger 1 due to operation of the soot removing device 5 from time $T_{B1}$. Furthermore, in this embodiment, the exclusion period τe is set as a period until the amplitude of the turbulence becomes greater than 63.2% of a stabilized value determined by the temperature variation before operation of the soot removing device 5. In (a1) of FIG. 6A, h1 indicates the magnitude of the above described stabilized value determined by the temperature variation before operation of the soot removing device 5. Further, in FIG. 6A, tc indicates a period until turbulence applied to the state amount svt (kt) of the carbon containing fuel heat exchanger 1 due to operation of the soot removing device 5 after the operation point $T_1$ of the soot removing device 5 attenuates and falls within a predetermined range.

Then, with reference to (a1) in FIG. 6A, at time $T_2$ that is 20 minutes after the operation time $T_1$ of the soot removing device 5, the variation waveform of the temperature, which is actual measurement data of the state amount svt (kt1), becomes greater than the magnitude of 63.2% of the stabilized value indicated by h1. Thus, as shown in (a2) of FIG. 6A, even if the exclusion period τe is fixed to be from the operation time $T_1$ of the soot removing device 5 to the time $T_3$ that is one hour after time $T_1$, it is possible to sufficiently remove influence of turbulence due to operation of the soot removing device 5, from the actual measurement data of the state amount svt (kt1). Furthermore, as shown in (a3) of FIG. 6A, in a case where the exclusion period τe is set as a period having a further margin in addition to the period until the amplitude of the turbulence becomes greater than the magnitude of 63.2% of the stabilized value, the exclusion period τe may be set as a period from the operation time $T_1$ to time $T_3$ that is one hour after time $T_1$. As a result, as shown in (a2) and (a3) in FIG. 6A, before and after the exclusion period τe, only the temperature data of the state amount svt (k1) exceeding the stabilized value h1 remains non-excluded.

Then, as the soot removing device 5 operates at time $T_4$, as shown in (a1) of FIG. 6A, at time $T_5$, the amplitude of turbulence slightly exceeds the magnitude of 63.2% of the stabilized value represented by h1. Thus, as shown in (a2) and (a3) of FIG. 6A, by setting the exclusion period τe as a period from time $T_4$ to time $T_5$ that is one hour after $T_4$, it is possible to sufficiently exclude influence of turbulence due to operation of the soot removing device 5.

In (b1) of FIG. 6B, h2 indicates the magnitude of the above described stabilized value determined by the temperature variation before operation of the soot removing device 5. Further, in FIG. 6B, tc indicates a period until turbulence applied to the state amount svt (kt) of the carbon containing fuel heat exchanger 1 due to operation of the soot removing device 5 after the operation point $T_1$ of the soot removing device 5 attenuates and falls within a predetermined range.

Then, with reference to (b1) in FIG. 6B, two hours after the operation time $T_1$ of the soot removing device 5, the variation waveform of the temperature, which is actual measurement data of the state amount svt (kt1), becomes greater than the magnitude of 63.2% of the stabilized value represented by h2.

Thus, as shown in (b2) of FIG. 6B, if the exclusion period τe is fixed to be from the operation time $T_1$ of the soot removing device 5 to the time $T_2$ that is one hour after time $T_1$, influence of turbulence due to operation of the soot removing device 5 is still present at time $T_2$, which is the termination point of the exclusion period τe. As a result, in a case shown in (b2) of FIG. 6B, influence of turbulence due to operation of the soot removing device 5 cannot be fully excluded when performing abnormality diagnosis, only by excluding the temperature data obtained in the exclusion period τe. Thus, as shown in (b3) of FIG. 6B, in a case where the exclusion period τe is set as a period until the amplitude of the turbulence becomes greater than the magnitude of 63.2% of the stabilized value indicated by h2, the exclusion period τe is set as a period of two hours after the operation time $T_1$ of the soot removing device 5. As a result, as shown in (b3) of FIG. 5, at time $T_3$, which is the terminating point of the exclusion period τe, the influence of turbulence due to operation of the soot removing device 5 is substantially absent, and thus it is possible to perform abnormality diagnosis while fully excluding influence of turbulence due to operation of the soot removing device 5.

Further, as shown in (b2) of FIG. 6B, if the ending time of the exclusion period τe is set at time $T_5$ one hour after operation of the soot removing device 5 at time $T_4$, only an extremely brief time is left at time $T_5$ until the next operation time $T_6$ of the soot removing device 5. If the time between the ending time $T_5$ of the exclusion period τe and the next operation time $T_6$ of the soot removing device 5 is extremely short, the response characteristic of the temperature change obtained by actually measuring the state amount svt (kt) becomes unstable. Thus, in an alternative embodiment, as shown in (b3) of FIG. 6B, the exclusion period τe may be set as a period from time $T_4$ of operation of the soot removing device 5 to time $T_7$ of the second next operation of the soot removing device 5. As a result, as shown in (b3) in FIG. 6B, before and after the exclusion period τe, only the temperature data of the state amount svt (k1) exceeding the stabilized value h1 remains non-excluded.

Accordingly, in this embodiment, the exclusion period τe is set on the basis of the response characteristic shown in the temporal change of the at least one state amount svt (kt) after operation of the soot removing device 5. Thus, according to this embodiment, in a case where the response characteristics indicate a quick response, it is possible to set the exclusion period τe to be accordingly short. On the other hand, if the response characteristics indicate a slow response, it is possible to set the exclusion period to be accordingly long.

Further, in the above configuration, in a case where the response characteristic of the at least one state amount svt (kt) after operation of the soot removing device 5 indicates a quick response, the time constant τr indicating the response characteristics should also be small. In a case where the response characteristic indicates a slow response, the time constant τr indicating the response characteristic should also be large. Thus, in this configuration, the correlation between the time constant τr indicating the response characteristic and the length of the exclusion period τe is set in advance, and the exclusion period τe corresponding to the magnitude of the time constant τr is set on the basis of the correlation. Thus, according to this configuration, it is possible to set an appropriate length for the exclusion period τe in accordance with the magnitude of the time constant τr.

Further, in another illustrative embodiment, in the process of obtaining the abnormality diagnosis data dd (k), the exclusion period setting part 121a may set the length of the exclusion period τe so as to reduce the difference between the frequency distribution and the normal distribution related to the time-series data ds (kt) of the at least one state amount svt (kt). In this embodiment, the data de (kt) in the exclusion period τe excluded from abnormality diagnosis is data obtained in a transient time range in which a part of the state amount svt (kt) is affected by operation of the soot removing device 5. Thus, even in a case where data collected in a period other than the exclusion period τe from the device for the plurality of state amounts sv (k) is distributed according to the normal distribution, the data of the state amount collected in the exclusion period τe may not necessarily be distributed according to the normal distribution.

Thus, in this embodiment, the length of the exclusion period τe is determined so as to reduce the difference between the frequency distribution and the normal distribution related to the data ds (kt) obtained in relation to the at least one state amount svt (kt). Thus, according to this embodiment, it is possible to set the exclusion period τe as a transient time range in which the state amount svt (kt) is affected by operation of the soot removing device 5 (a period in which the frequency distribution is offset from the normal distribution), and the data de (kt) obtained in this period is not used in the abnormality diagnosis, and thus abnormality diagnosis can be performed accurately. Hereinafter, this embodiment will be described in detail with reference to FIGS. 5 and 7.

The frequency distribution 92 shown on the right side of FIG. 5 is a frequency distribution of temperature measurement values included in the second section 82, which follows the normal distribution. Furthermore, as described in detail below, the frequency distribution of temperature measurement values included in the first section 81 is a frequency distribution combining the frequency distribution 91 and the frequency distribution 92 shown on the right side of FIG. 5. With the frequency distribution 91 added to the frequency distribution 92, the frequency distribution does no longer follow the normal distribution. Furthermore, at time $T_{B1}$ and time $T_{B2}$ shown in FIG. 5, the soot removing device 5 is in operation. Thus, in the first section 81 positioned in a time range from time $T_{B1}$ to time $T_{S2}$, a component of the above turbulence due to operation of the soot removing device 5 is added to the temperature measurement values having the same frequency distribution as those measured in the second section 82. Furthermore, as the temperature variation corresponding to a component of temperature due to operation of the soot removing device 5 is added to the temperature variation similar to the temperature variation in the second section 82, the temperature distribution in the first section 81 is a distribution where the frequency distribution 91 corresponding to a component of temperature is added to a frequency distribution similar to the frequency distribution 92. As a result, the frequency distribution of temperature measurement values included in the first section 81 is a non-normal distribution where the frequency distribution 91 is added to the frequency distribution 92.

Accordingly, in the time range from time $T_{B1}$ to time $T_{S2}$, due to addition of the temperature variation corresponding to a component of turbulence due to operation of the soot removing device 5, the temperature distribution in the first section 81 becomes a non-normal distribution, while the temperature distribution in the second section 82 not affected by operation of the soot removing device 5 becomes a normal distribution. From another perspective, if the length of the exclusion period τe is sufficient to exclude the influence of operation of the soot removing device 5 on the state amount svt (kt), the difference between the temperature data distribution of the state amount svt (kt) and the normal distribution should become smaller. In contrast, if the length of the exclusion period τe is not sufficiently long to exclude the influence of operation of the soot removing device 5 on the state amount svt (kt), the difference between the temperature data distribution of the state amount svt (kt) and the normal distribution should become greater.

Thus, in this embodiment, the exclusion period setting part 121a may determine the length of the exclusion period τe so as to reduce the difference between the frequency distribution and the normal distribution related to the data ds (kt) obtained in relation to the at least one state amount svt (kt) affected by operation of the soot removing device 5, as described below with reference to FIG. 7. Furthermore, in an illustrative embodiment, when determining the length of the exclusion period τe, so as to reduce the difference between the frequency distribution and the normal distribution related to the data ds (kt), the length of the exclusion period τe may be determined on the basis of an index of consistency between the frequency distribution and the normal distribution.

According to this embodiment, when setting the length of the exclusion period τe, an index of consistency between the frequency distribution and the normal distribution is taken into account, and thus it is possible to more accurately identify a transient time range during which the state amount svt (kt) is affected by operation of the soot removing device 5 by using the index. Thus, it is possible to set the exclusion period τe more appropriately, and to improve the accuracy of abnormal diagnosis. That is, the length of the exclusion period τe may be determined so as to increase an index used to evaluate the consistency between the frequency distribution and the normal distribution related to the data ds (kt) obtained in relation to the state amount svt (kt). Hereinafter, the index of the consistency between the frequency distribution and the normal distribution related to the data ds (kt) will be described with reference to FIG. 7.

Figure 7A:
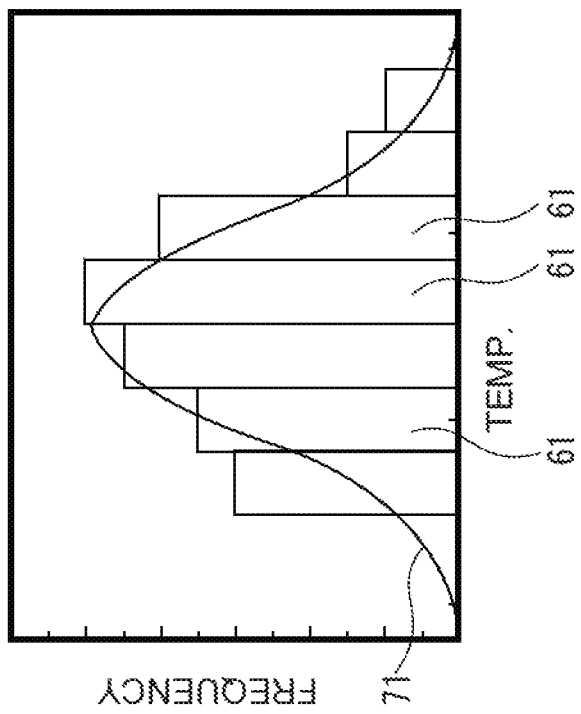
FIGS. 7A and 7B are diagrams for describing the consistency of the frequency distribution and the normal distribution of the device state.
Figure 7B:
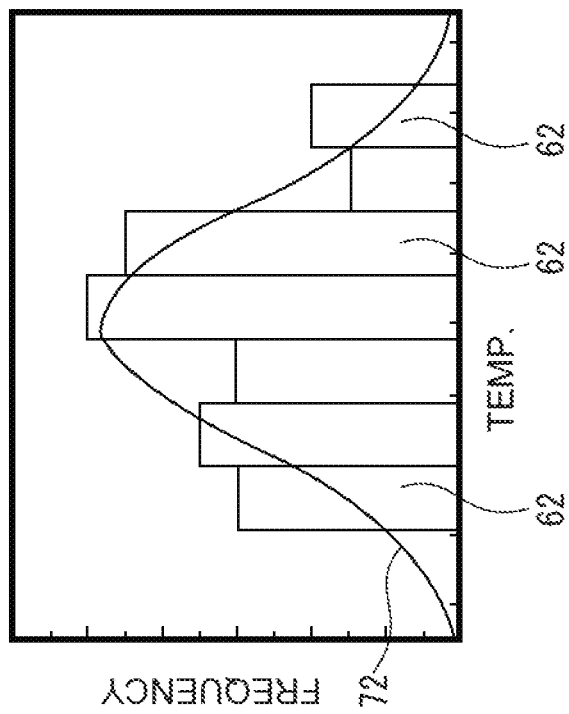

FIG. 7A shows a case where the consistency between the frequency distribution 61 related to data ds (kt) obtained in relation to the state amount svt (kt) and the normal distribution curve 71 is high. FIG. 7B shows a case where the consistency between the frequency distribution 62 related to data ds (kt) obtained in relation to the state amount svt (kt) and the normal distribution curve 72 is low. In FIGS. 7A and 7B, x-axis is class value th of temperature data obtained by actually measuring the state amount svt (kt). To simplify the description, in FIGS. 7A and 7B, in an embodiment, the frequency distribution related to data ds (kt) and the normal distribution are standardized so as to have the same average and standard variation. In the example shown in FIG. 7, the difference between the frequency distribution and the normal distribution related to data ds (kt) may be evaluated numerically with the following scale, for instance.

In the example shown in FIG. 7, if the frequency distribution and the normal distribution are standardized so as to have the same average and standard variation, the consistency φ between the frequency distribution and the normal distribution curve can be calculated by the following expression. Herein, deg (th) is the degree of the actual measurement data at a temperature class value th, and nd (th) is the height of the normal distribution curve at a temperature class value th.

$$\phi = \sum_{th} \{deg(th) - nd(th)\}^2 \qquad \text{(Expression 1)}$$

Furthermore, if the frequency distribution related to data ds (kt) obtained for the state amount svt (kt) and the normal distribution are not standardized to have the same average and standard variation, firstly, the average μ and the standard variation σ of the frequency distribution may be obtained, and a normal distribution with distribution parameters being the average μ and the standard variation σ may be used.

As described above, in some embodiments described above with reference to FIGS. 5 to 7, provided that the carbon containing fuel heat exchanger 1E shown in FIG. 1 is the device 1 to be diagnosed, only the influence of operation of the soot removing device 5E disposed directly above the carbon containing fuel heat exchanger 1E on the state amount of the carbon containing fuel heat exchanger 1 is taken into account. Next, in the following embodiment described with reference to FIG. 8, as influence from another device that causes a state change of the carbon containing fuel heat exchanger 1, influence of operation of the soot removing device 5' of the preceding device 1' positioned upstream of the carbon containing fuel heat exchanger 1 will be also taken into account. For instance, provided that the carbon containing fuel heat exchanger 1E shown in FIG. 1 is the device 1 to be diagnosed, in addition to influence due to operation of the soot removing device 5E, influence due to operation of the soot removing device 5D and the soot removing device 5C is also taken into account. Herein, the soot removing device 5D and the soot removing device 5C are soot removing devices 5' provided to prevent abnormality of the carbon containing fuel heat exchangers 1D and 1C corresponding to the preceding devices 1' positioned upstream of the carbon containing fuel heat exchanger 1E.

Hereinafter, with reference to FIG. 8, described is an example of setting of the exclusion period τe in a case where influence of the above three soot removing devices 5E, 5D, and 5C is applied as turbulence to the carbon containing fuel heat exchanger 1E shown in FIG. 1. FIG. 8A is a diagram showing the time of operation of the three soot removing devices 5, where x-axis is time scale. In FIG. 8B, the curve graph 84 shows the temporal change of the actual measurement value of the state amount svt (kt1), where x-axis is time scale. Herein, the state amount svt (kt1) corresponds to the temperature at the inlet portion for fuel gas, positioned in the top section of the carbon containing fuel heat exchanger 1E, of the temperatures svt (kt) (kt=kt1, kt2, kt3, . . . , ktm) at a plurality of positions in the flow direction G on the primary side of the carbon containing fuel heat exchanger 1E.

FIG. 8C is a diagram showing the time of operation of three soot removing devices 5E and 5D. In FIG. 8D, the curve graph 85 shows the temporal change of the actual measurement value of the state amount svt (ktm). Herein, among the temperatures svt (kt) (kt=kt1, kt2, kt3, . . . , ktm) at a plurality of positions in the flow direction G on the primary side of the carbon containing fuel heat exchanger 1E, the state amount svt (ktm) corresponds to the temperature at the outlet portion for fuel gas, positioned in the bottom section of the carbon containing fuel heat exchanger 1E. In FIG. 8E, the curve graph 86 shows the temporal change of a temperature difference obtained by subtracting the actual measurement value of the state amount svt (ktm) from the actual measurement value of the state amount svt (kt1). That is, the curve graph 86 shown in FIG. 8E is a graph plotting the temperature difference obtained by subtracting the value at each time of the curve graph 85 in FIG. 8D from the value at each time on the curve graph 84 in FIG. 8B, along the time scale.

With reference to FIG. 8, the soot removing device 5C operates at time $T_1$, and influence Br11 of turbulence due to operation of the soot removing device 5C is shown as a rapid temperature decrease of the temperature svt (kt1) shown in FIG. 8B. Further, influence Br21 of turbulence due to operation of the soot removing device 5C is shown as a rapid temperature decrease of the temperature svt (ktm) shown in FIG. 8D. That is, while the soot removing device 5C removes soot from the heat exchanger 1C disposed upstream of the heat exchanger 1E, influences Br11 and Br21 of turbulence due to operation of the soot removing device 5C are on not only the heat exchanger 1C but also the heat exchangers 1D and 1E. This is because, when the heat exchange efficiency of the heat exchanger 1C disposed upstream of the heat exchanger 1E is rapidly improved by operation of the soot removing device 5, the temperature decrease of fuel gas passing the heat exchanger 1C also becomes greater rapidly. That is, for the temperature of fuel gas supplied to the heat exchangers 1D and 1E decreases rapidly due to improvement of the heat change efficiency at the heat exchanger 1C, such a temperature decrease acts as turbulence that causes a non-stationary state change on the heat exchangers 1D and 1E.

Subsequently, the soot removing device 5D operates at time $T_2$, and influence Br31 of turbulence due to operation of the soot removing device 5D is shown as a rapid temperature decrease of the temperature svt (ktm) shown in FIG. 8D. Herein, with reference to FIG. 8D, the rapid decrease of the temperature svt (ktm) caused by the influence Br31 of operation of the soot removing device 5D at time $T_2$ appears as being added to the rapid decrease of the temperature svt (ktm) caused by the influence Br21 of operation of the soot removing device 5C at time $T_1$. Further, since time $T_2$ is the point of time immediately after time $T_1$ of operation of the soot removing device 5C, the influence of turbulence due to operation of the soot removing device 5D is not present in the temperature svt (kt1) shown in FIG. 8B. Furthermore, the soot removing device 5E for removing soot from the heat exchanger 1E operates at time $T_3$, and influence Br32 due to operation of the soot removing device 5E is shown as a rapid temperature decrease of the temperature svt (ktm) shown in FIG. 8D. Further, at time $T_4$ and time $T_5$, operation of the soot removing devices 5C and 5D causes a phenomenon similar to that at time $T_1$ and $T_2$.

Accordingly, at time $T_1$ and time $T_2$, from time $T_1$, the transient state period τt starts, in which a non-stationary state change is applied to the heat exchanger 1E due to the influence Br21 and the influence Br31 of turbulence due to operation of the soot removing device 5C and the soot removing device 5D on the temperature actual measurement values of the state amount svt (ktm). As described above, even if one of the three soot removing devices 5C, 5D, and 5E is operated, the rapid decrease in the temperature svt (ktm) is applied to the heat exchanger 1E as a non-stationary state change. Thus, in an illustrative embodiment, in the example shown in FIG. 8, the transient state detection part 120 may detect start of the transient state period τt as follows. That is, a logical add output signal of a logical add (OR) of three trigger signals for switching each of the three soot removing devices 5C, 5D, and 5E from a stop state to an operation state may be monitored, and it may be determined that the transient state period τt is started at the time when the logical add signal becomes active.

In an illustrative embodiment, in the example shown in FIG. 8, the exclusion period setting part 121*a* may set an exclusion period τe, which is at least a part of the transient state period τt, on the basis of the response characteristic of the state amount svt (kt) after operation of one of the soot removing devices 5C, 5D, 5E. Specifically, the exclusion period setting part 121*a* may select an appropriate exclusion period τe from the transient state period τt, which is a period until turbulence applied to the state amount svt (kt) of the carbon containing fuel heat exchanger 1 due to operation of one of the soot removing devices 5C, 5D, 5E after the operation point of one of the soot removing devices 5C, 5D, 5E attenuates and falls within a predetermined range. For instance, the duration of the transient state until the turbulence applied to the state amount svt (kt) of the carbon containing fuel heat exchanger 1 due to operation of one of the soot removing devices 5C, 5D, and 5E attenuates and falls within a predetermined range can be estimated focusing on the response characteristic shown by the change of the state amount svt (kt1) described above with reference to FIGS. 5 and 6. As a result, in FIG. 8D, the exclusion period τe for excluding influence of operation of the soot removing devices 5C and 5D at time $T_1$ and $T_2$ is set as $t_c^{(1)}$, and the exclusion period τe for excluding influence of operation of the soot removing device 5E at time $T_3$ is set as $t_c^{(2)}$. Furthermore, in FIG. 8D, the exclusion period τe for excluding influence of operation of the soot removing devices 5C and 5D at time $T_4$ and $T_5$ is set as $t_c^{(3)}$.

Further, in another embodiment, in the transient state period τt started by operation of one of the soot removing devices 5C, 5D, or 5E, the transient state period svt (kt) is distributed according to the non-normal distribution. In contrast, after the transient state period τt elapses, the temperature svt (kt) is distributed according to the normal distribution. Accordingly, the exclusion period τe included in the transient state period τt started by operation of one of the soot removing devices 5C, 5D, or 5E can be determined by the exclusion period setting part 121*a* according to the above method described with reference to FIG. 7.

Furthermore, in yet another embodiment, the exclusion period τe included in the transient state period τt started by operation of one of the soot removing devices 5C, 5D, or 5E can be determined as follows. That is, the temporal change 86 shown in FIG. 8E is monitored as a temperature difference between the inlet side and the outlet side of the fuel of the heat exchanger 1E, assuming that the exclusion period τe starts from the starting point of the transient state period τt. Further, a point of time at which the temperature difference is within ±37.8% of the stabilized value h3 shown in FIG. 8E is set to be the ending point of the exclusion period τe. That is, this method corresponds to the technique for determining the length of the exclusion period τe focusing on the response characteristic shown by the temporal change 86 of the temperature difference.

As described above, in the embodiment described above with reference to FIGS. 5 to 8, only the influence of operation of one of the soot removing devices 5C to 5X disposed inside the gas cooler 32*b* to remove soot from one of the carbon containing fuel heat exchangers 1C to 1X is considered as turbulence that causes a non-stationary state change. However, for instance, even in a case where a rapid change occurs in the generated gas flow amount in the coal gasification part 32*a* connected to the preceding stage of the gas cooler 32*b*, there may be influence of turbulence that causes a non-stationary state change of the carbon containing fuel heat exchangers 1C to 1X. In this case, a rapid change of the generated gas flow rate transmits as a response delay of the state change, which affects "the temperatures at a plurality of locations in the gas flow passage direction of the primary side", which are the state amounts of the carbon containing fuel heat exchanger 1. Further, influence of the turbulence may cause a non-stationary state change that is similar to influence of operation of the soot removing devices 5C to 5J. As a result, if actual measurement data of the state amount in the carbon containing fuel heat exchanger 1 is obtained within the transient state period in which a rapid change of the above generated gas flow amount is transmitted as a response delay of the state change, the actual measurement data deviates from the unit space for obtaining the Mahalanobis distance, which may lead to generation of wrong abnormal diagnosis results.

Thus, in yet another embodiment, even in the above case, the transient state detection part 120 may detect start of the transient state period τt in which a non-stationary state change of the carbon containing fuel heat exchanger 1 disposed inside the gas cooler 32b occurs. For instance, the transient state detection part 120 may detect start of the transient state period τt as follows, by modeling the rapid change of the generated gas flow rate at the coal gasification part 32a as a step input of the state change corresponding to the generated gas flow rate. First, of the state amounts of the carbon containing fuel heat exchanger 1, the first response waveform of the state change is obtained continuously for a part of state amounts svx (kx) related to the generated gas flow rate. Next, a step response waveform obtained as a result of input of the step input of the state amount svx (kx) into the response characteristic function of the carbon containing fuel heat exchanger 1 is calculated. Finally, the step response waveform is compared to the first response waveform, and start of the transient state period τt may be detected on the basis of the comparison result. For instance, the transient state detection part 120 may determine that the transient state period τt starts when the first response waveform that is offset from the step response waveform by a difference smaller than a predetermined reference value is obtained.

Once start of the transient state period τt is detected as described above, the diagnosis data generation part 121b may perform pre-processing of excluding the data de (kt) of at least one state amount svt (kt) obtained in an exclusion period τe which is at least a part of the transient state period τt, from the time-series data ds (k) of the state amount. Finally, the diagnosis data generation part 121b may obtain the abnormality diagnosis data dd (k) excluding the data de (kt) in the exclusion period τe from the time-series data ds (k) for the plurality of state amounts sv (k).

Figure 9:
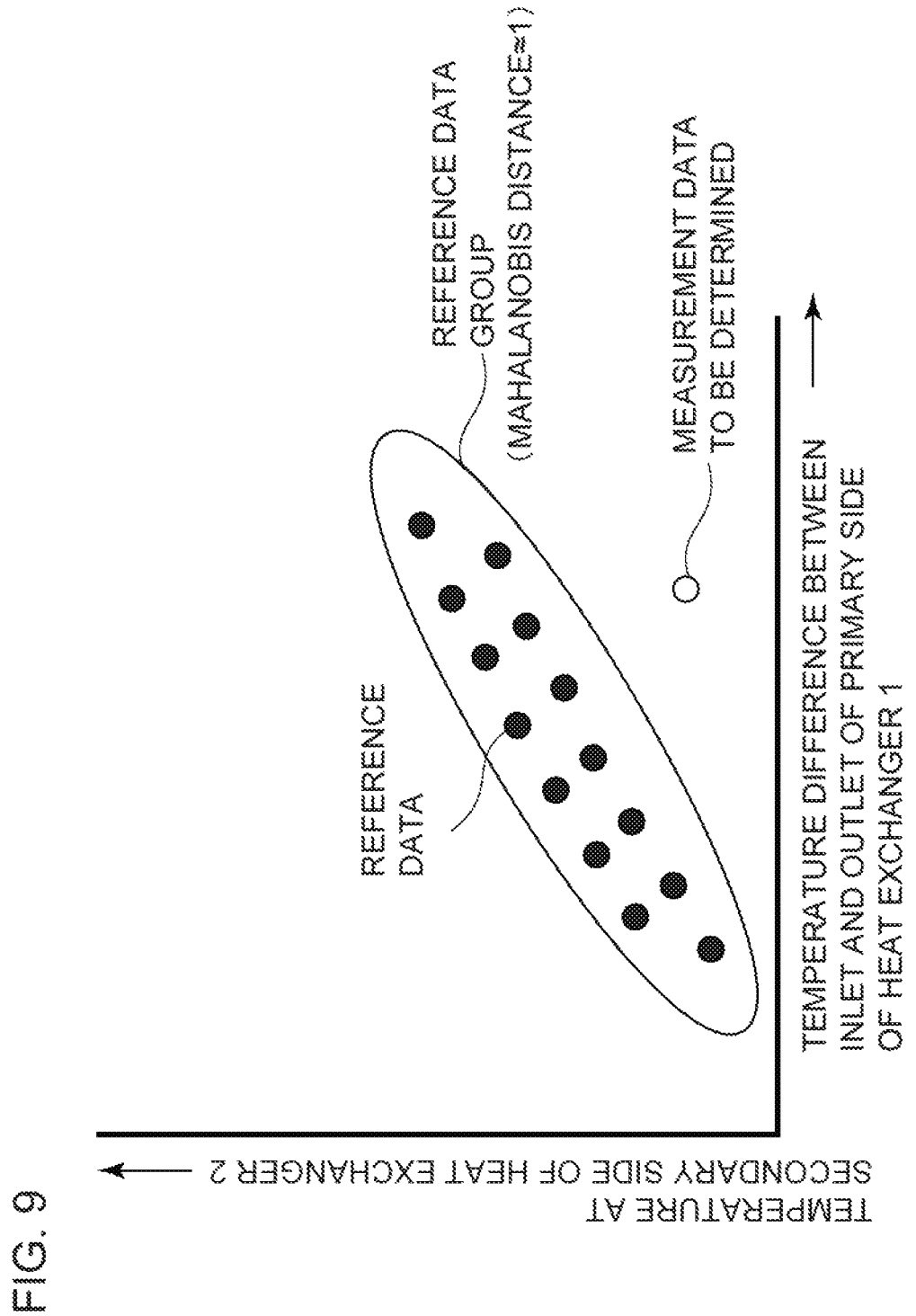
FIG. 9 is a diagram for describing the concept of the Mahalanobis distance calculated from the device state, with reference to a unit space.

Next, described below is a method by which the abnormality diagnosis part 122 having received the abnormality diagnosis data dd (k) (1≤k≤K) from the diagnosis data acquisition part 121 performs abnormality diagnosis on the carbon containing fuel heat exchanger 1 on the basis of the Mahalanobis distance. First, the concept of the Mahalanobis distance calculated by the abnormality diagnosis part 122 will be described with reference to FIG. 9. FIG. 9 is a diagram showing a correlation of two parameters, where x-axis is a difference between the inlet temperature svt (kt1) and the outlet temperature svt (kt2) in the flow direction G on the primary side of the heat exchanger 2, and y-axis is the temperature svu (ku1) at a point in the flow direction W on the secondary side of the heat exchanger 2. That is, as soot accumulates on the heat transfer surface 6, the efficiency of heat exchange between the fuel and the heat exchange medium decreases, and thus the temperature svu (ku1) of a point on the secondary side of the heat exchanger 2 decreases. While each measurement data has variability due to variation in the atmosphere condition and the operation state, there is a correlation between the temperature difference between the inlet temperature svt (kt1) and the outlet temperature svt (kt2) and the temperature svu (ku1) of a point on the secondary side of the heat exchanger 2, and each data is within a particular range. By using this data as reference data, a reference unit space is generated. Also for other state amounts, it is possible to obtain a correlation similar to the correlation between the temperature on the primary side and the temperature on the secondary side. Further, for the unit space, it is determined whether the data to be determined is normal or abnormal, using the Mahalanobis distance.

Accordingly, in an illustrative embodiment, the abnormality diagnosis part 122 of the abnormality diagnosis device 10 may perform abnormality diagnosis of the carbon containing fuel heat exchanger 1 as follows. First, the Mahalanobis distance MD (k) of the abnormality diagnosis data dd (k) (1≤k≤K) is calculated with reference to a unit space including a plurality of state amounts svn (k) (1≤k≤K) at the time when the carbon containing fuel heat exchanger 1 is normal. Next, if the Mahalanobis distance MD (k) is greater than a threshold, it is determined that the carbon containing fuel heat exchanger 1 is abnormal.

That is, in this embodiment, the Mahalanobis distance MD (k) of the abnormality diagnosis data dd (k) (1≤k≤K) is calculated with reference to a unit space including a plurality of state amounts svn (k) (1≤k≤K) at the time when the carbon containing fuel heat exchanger 1 is normal. Thus, according to this embodiment, it is possible to evaluate quantitatively the extent of deviation of the abnormality diagnosis data dd (k) not affected by operation of the soot removing device 5 from the unit space representing the state group svn (k) (1≤k≤K) at the time when the device is normal. As a result, according to this embodiment, it is possible to diagnose an abnormality of the device with a high accuracy on the basis of the abnormality diagnosis data dd (k) not affected by operation of the soot removing device 5.

Figure 10:
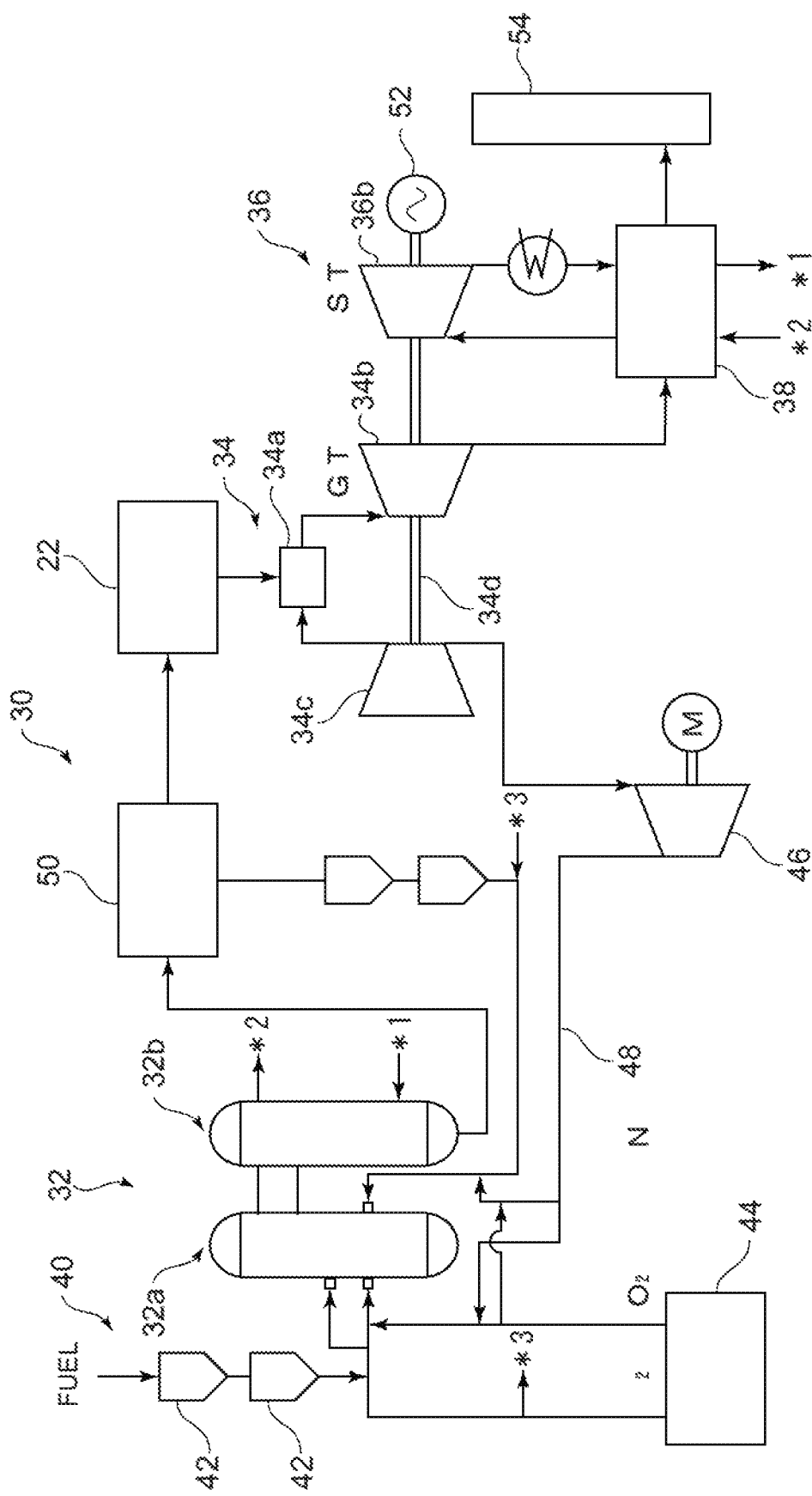
FIG. 10 is a diagram showing an IGCC plant for applying the device abnormality diagnosis by the abnormality diagnosis device, according to some embodiments of the present invention.

Herein, the carbon containing fuel heat exchanger 1 shown in FIG. 1 is provided for an integrated gasification combined cycle plant (hereinafter, referred to as "IGCC plant") shown in FIG. 10, for instance. As shown in FIG. 10, the IGCC plant 30 mainly includes a coal gasification furnace 32, a gas turbine facility 34, a steam turbine facility 36, and a heat recovery steam generator (hereinafter, referred to as "HRSG") 38. On the upstream side of the coal gasification furnace 32, a coal supplying facility 40 for supplying powdered fuel to the coal gasification furnace 32 is provided. The coal supplying facility 40 includes a pulverizer (not shown) configured to pulverize coal into powdered coal of a few μm to a few hundreds of μm. The powdered fuel pulverized by the pulverizer is stored in a plurality of hoppers 42. The powdered fuel stored in each hopper 42 is transported to the coal gasification furnace 32 with nitrogen gas supplied from an air separation facility 44 by a constant flow rate. The air separation facility 44 is a device to separate nitrogen gas and oxygen gas from air and supply these gases to the coal gasification furnace 32.

The coal gasification furnace 32 includes a coal gasification part 32a formed so that the gas flows from bottom toward top, and a gas cooler (SGC) 32b connected to the downstream side of the coal gasification part 32a and formed so that the gas flows from top to bottom. In the coal gasification part 32a, a combustor and a reductor are disposed from below. The combustor combusts a part of powdered fuel and char, and discharges the rest through thermal decomposition as volatile portions (CO, $H_2$, lower class carbon hydride). The combustor and the reductor are provided with a combustor burner and a reductor burner, respectively, to which powdered fuel is supplied from the coal supplying facility 40. The combustor burner is supplied with air extracted from the air compressor 34c of the gas turbine facility 34 via an air pressure-increasing unit 46 and an oxidizing-agent supplying passage 48, as an oxidizing agent with oxygen gas separated by the air separation facility 44. In the reductor, powdered coal is gasified by high-temperature combustion gas from the combustor. Accordingly, a combustible gas that serves as a gas fuel such as CO and $H_2$ (hereinafter, referred to as "fuel gas") is generated from coal.

The gas cooler 32b includes a plurality of carbon containing fuel heat exchangers 1 described above. The gas cooler 32b obtains sensible heat from fuel gas introduced from the reductor to produce steam, and cools the fuel gas generated in the gasification furnace 32. The steam generated in the carbon containing fuel heat exchanger 1 is mainly used as steam for driving the steam turbine 36b. The fuel gas having passed through the gas cooler 32b is introduced to a dirt removing facility 50. The dirt removing facility 50 includes a porous filter, and captures and recovers char including non-combusted matters mixed in fuel gas, by making the char pass through the porous filter. The char accordingly recovered is returned to a char burner of the coal gasification furnace 32 to be recycled.

The fuel gas having passed through the dirt removing facility 50 is purified by the gas purifying facility 22, and is sent to the combustor 34a of the gas turbine facility 34. The gas turbine facility 34 includes a combustor 34a for combusting fuel gas, a gas turbine 34b driven by fuel gas, and an air compressor 34c for sending high-pressure air to the combustor 34a. The gas turbine 34b and the air compressor 34c are connected by the same rotational shaft 34d. The air compressed by the air compressor 34c is extracted and also introduced to the air pressure-increasing unit 46, separately from the combustor 34a.

The combustion exhaust gas having passed through the gas turbine 34b is introduced to the HRSG 38. The steam turbine 36b is supplied with high-pressure steam from the coal gasification furnace 32 and the HRSG 38. As an example, a gas turbine 34b and a steam turbine 36b are connected to the rotational shaft 34d, and a generator 52 for outputting electric power is disposed opposite to the gas turbine 34 across the steam turbine facility 36. Further, the HRSG 38 produces steam from combustion exhaust gas from the gas turbine 34b, and discharges the combustion exhaust gas to the ambient air through a stack 54.

As described above, the carbon containing fuel heat exchanger 1 shown in FIG. 2 is provided for the gas cooler 32b in the coal gasification furnace 32 of the IGCC plant 30, for instance. Further, the carbon containing fuel heat exchanger 1 exchanges heat between fuel gas, which is a fuel containing carbon, and the heat exchange medium. If carbon adheres to the heat transfer surface 6 and cannot be removed by the soot removing device 5, an abnormality may occur in the carbon containing fuel heat exchanger 1 through which a carbon containing fuel flows, such as failure to perform heat exchange sufficiently due to clogging of the heat transfer surface 6. Thus, the abnormality diagnosis device 10 determines presence or absence of an abnormality of the carbon containing fuel heat exchanger 1 by using the Mahalanobis distance.

DESCRIPTION OF REFERENCE NUMERALS 1 (1C to 1X) Device to be diagnosed (coal containing fuel heat exchanger)
2 Heat exchanger
3 Fuel flow passage
4 Heat-transfer tube
5 (5C to 5X) Abnormality prevention device (soot removing device)
10 Abnormality diagnosis device
11 Input/output part
12 Processing part
13 Memory part
14 Terminal device
14C Input unit
14D Display
22 Gas purifying facility
30 Plant
32 Coal gasification furnace
32a Coal gasification part
32b Articulated device group (gas cooler)
34 Gas turbine facility
34a Combustor
34b Gas turbine
34c Air compressor
34d Rotational shaft
36 Steam turbine facility
36b Steam turbine
40 Coal supplying facility
42 Hopper
44 Air separation facility
46 Air pressure-increasing unit
48 Oxidizing-agent supplying passage
50 Dirt removing facility
52 Generator
54 Stack
61, 62 Frequency distribution
71, 72 Normal distribution curve
81 First section
82 Second section
91, 92 Frequency distribution
121 Diagnosis data acquisition part
121a Exclusion period setting part
121b Diagnosis data generation part
122 Abnormality diagnosis part
G, W Flow direction
MD Mahalanobis distance
dd Abnormality diagnosis data
de Exclusion data
ds Time-series data
sv, svn, svt, svu State amount
th Temperature class value

The invention claimed is:

1. A device abnormality diagnosis method for a device to be diagnosed constituting a plant, the abnormality diagnosis method comprising:
a step of obtaining time-series data of a plurality of state amounts of the plant which are correlated to an abnormality of the device to be diagnosed;
a step of obtaining abnormality diagnosis data on the plurality of state amounts by performing pre-processing on at least one state amount of the plurality of state amounts to exclude, from the time-series data on the state amounts, data of the at least one state amount obtained in an exclusion period which is at least a part of a transient state period during which the device to be diagnosed is affected by a state change of another constituent device of the plant; and a step of performing abnormality diagnosis on the device to be diagnosed on the basis of the abnormality diagnosis data of the plurality of state amounts.

2. The device abnormality diagnosis method according to claim 1, wherein the other constituent device is an abnormality prevention device disposed on the device to be diagnosed or a device positioned in a preceding stage of the device to be diagnosed, and wherein the transient state period is a period during which the device to be diagnosed is affected by operation of the abnormality prevention device.

3. The device abnormality diagnosis method according to claim 1, wherein the step of obtaining the abnormality diagnosis data includes:

determining a length of the exclusion period on the basis of a response characteristic of the at least one state amount after start of the state change of the other constituent device; and excluding, from the time-series data, data of the at least one state amount obtained within the exclusion period set on the basis of the response characteristic.

4. The device abnormality diagnosis method according to claim 3, wherein, when setting the length of the exclusion period on the basis of the response characteristic, the length of the exclusion period is determined by applying a time constant obtained from a temporal change of the at least one state amount obtained after start of the state change of the other constituent device to a pre-set correlation between the time constant, which indicates the response characteristic of the at least one state amount after start of the state change of the other constituent device, and the length of the exclusion period.

5. The device abnormality diagnosis method according to claim 1, wherein the step of obtaining the abnormality diagnosis data includes determining a length of the exclusion period so as to reduce a difference between a frequency distribution and a normal distribution related to the time-series data of the at least one state amount.

6. The device abnormality diagnosis method according to claim 5, wherein the step of obtaining the abnormality diagnosis data includes determining the length of the exclusion period on the basis of an index indicating consistency between the frequency distribution and the normal distribution.

7. The device abnormality diagnosis method according to claim 1, wherein the step of performing abnormality diagnosis on the device includes:

calculating a Mahalanobis distance of the abnormality diagnosis data with reference to a unit space including the plurality of state amounts at a normal time of the device; and determining that the device has an abnormality if the Mahalanobis distance is greater than the threshold.

8. A device abnormality diagnosis device for a device to be diagnosed disposed in a plant, the abnormality diagnosis device comprising:

an input/output part configured to obtain time-series data of a plurality of state amounts of the plant which are correlated to an abnormality of the device to be diagnosed from a sensor of the plant, and output a result of abnormality diagnosis of the device to be diagnosed;

a diagnosis data acquisition part configured to obtain abnormality diagnosis data on the plurality of state amounts by performing pre-processing on the at least one state amount of the plurality of state amounts to exclude, from the time-series data on the state amounts, data of the at least one state amount obtained in an exclusion period which is at least a part of a transient state period during which the device to be diagnosed is affected by a state change of another constituent device of the plant; and an abnormality diagnosis part configured to perform abnormality diagnosis on the device to be diagnosed on the basis of the abnormality diagnosis data of the plurality of state amounts.

* * * * *